US011670001B2

(12) United States Patent
Mousavian et al.

(10) Patent No.: US 11,670,001 B2
(45) Date of Patent: Jun. 6, 2023

(54) OBJECT POSE ESTIMATION

(71) Applicant: NVIDIA Corporation, Santa Clara, CA (US)

(72) Inventors: Arsalan Mousavian, Seattle, WA (US); Yu Xiang, Seattle, WA (US); Dieter Fox, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 977 days.

(21) Appl. No.: 16/416,075

(22) Filed: May 17, 2019

(65) Prior Publication Data
US 2020/0363815 A1 Nov. 19, 2020

(51) Int. Cl.
*G06T 7/73* (2017.01)
*G06T 11/20* (2006.01)
*G06V 20/58* (2022.01)
*G06N 3/04* (2023.01)
*G06N 3/08* (2023.01)

(52) U.S. Cl.
CPC ........... *G06V 20/58* (2022.01); *G06N 3/0454* (2013.01); *G06N 3/08* (2013.01); *G06T 7/75* (2017.01); *G06T 11/20* (2013.01); *G06T 2207/20084* (2013.01); *G06T 2210/12* (2013.01)

(58) Field of Classification Search
CPC .... G06T 7/70; G06T 7/73; G06T 7/75; G06T 7/77; G06T 2207/20084; G06N 3/02; G06V 10/82
See application file for complete search history.

(56) References Cited

U.S. PATENT DOCUMENTS

2017/0109644 A1* 4/2017 Nariyambut Murali .....................
G06N 7/005

OTHER PUBLICATIONS

Choi, Changhyun, and Henrik I. Christensen. "RGB-D object tracking: A particle filter approach on GPU." 2013 IEEE/RSJ International Conference on Intelligent Robots and Systems. IEEE (Year: 2013).*
Kehl, Wadim, et al. "Ssd-6d: Making rgb-based 3d detection and 6d pose estimation great again." Proceedings of the IEEE international conference on computer vision (Year: 2017).*
(Continued)

*Primary Examiner* — Diane M Wills
(74) *Attorney, Agent, or Firm* — Davis Wright Tremaine LLP

(57) ABSTRACT

In an embodiment, a system provides object tracking and 6D pose estimations to a robot that performs different tasks such as manipulation and navigation. In an embodiment the 6D object pose is determined using a Rao-Blackwellized particle filtering framework, where the 3-D rotation and the 3-D translation of the object is decoupled. In an embodiment, the system provides the 3-D translation of an object along with a full distribution over the 3-D rotation. In an embodiment, the 3-D rotation is determined by discretizing the rotation space, and training an autoencoder network to construct a codebook of feature embeddings for the discretized rotations. In an embodiment, the system is able to track objects with arbitrary symmetries while also maintaining adequate posterior distributions.

24 Claims, 20 Drawing Sheets

(56) References Cited

OTHER PUBLICATIONS

Khan, Zia, Tucker Balch, and Frank Dellaert. "A rao-blackwellized particle filter for eigentracking." Proceedings of the 2004 IEEE Computer Society Conference on Computer Vision and Pattern Recognition, 2004. CVPR 2004 (Year: 2004).*
Mousavian, Arsalan, et al. "3d bounding box estimation using deep learning and geometry." Proceedings of the IEEE conference on Computer Vision and Pattern Recognition (Year: 2017).*
Sundermeyer, Martin, et al. "Implicit 3d orientation learning for 6d object detection from RGB images" Proceedings of the European conference on computer vision (ECCV) (Year: 2018).*
Azad et al., "6-DoF Model-based Tracking of Arbitrarily Shaped 3D Objects," IEEE International Conference on Robotics and Automation, 2011, 6 pages.
Brachmann et al., "Learning 6D Object Pose Estimation using 3D Object Coordinates," ECCV, 2014, 16 pages.
Calli et al., "The YCB Object and Model Set," In IEEE International Conference on Advanced Robotics, 2015, pp. 510-517.
Cao et al., "Real-time Scalable 6DOF Pose Estimation for Textureless Objects," IEEE International Conference on Robotics and Automation, 2016, 32 pages.
Choi et al., "3D Textureless Object Detection and Tracking: An Edge-Based Approach," IEEE/RSJ International Conference on Intelligent Robots and Systems, 2012, 8 pages.
Choi et al., "Robust 3D Visual Tracking Using Particle Filtering on the Special Euclidean Group: A Combined Approach of Keypoint and Edge Features," The International Journal of Robotics Research, 2012, 22 pages.
Collet et al., "The MOPED framework: Object Recognition and Pose Estimation for Manipulation," The International Journal of Robotics Research, 30(10): 2011, 22 pages.
Crivellaro et al., "A Novel Representation of Parts for Accurate 3D Object Detection and Tracking in Monocular Images," IEEE International Conference on Computer Vision, 2015, 9 pages.
Douc et al., "Comparison of Resampling Schemes for Particle Filtering," Proceedings of the 4th International Symposium on Image and Signal Processing and Analysis, Jul. 8, 2005, 10 pages.
Doucet et al., "Rao-Blackwellised Particle Filtering for Dynamic Bayesian Networks," Proceedings of the Sixteenth Conference on Uncertainty in Artificial Intelligence, 2000, 8 pages.
Hinterstoisser et al., "Gradient Response Maps for Real-Time Detection of Textureless Objects," IEEE Transactions on Pattern Analysis and Machine Intelligence, 2012, 14 pages.
Hinterstoisser et al., "Model Based Training, Detection and Pose Estimation of Texture-Less 3D Objects in Heavily Cluttered Scenes," ACCV, 2012, 14 pages.
Hodan et al., "On Evaluation of 6D Object Pose Estimation," ECCV, 2016, 14 pages.
Hodan et al., "T-LESS: An RGB-D Dataset for 6D Pose Estimation of Texture-Less Objects," IEEE Winter Conference on Applications of Computer Vision, 2017, 9 pages.
Kehl et al., "SSD-6D: Making RGB-Based 3D Detection and 6D Pose Estimation Great Again," ICCV, 2017, pp. 1521-1529.
Khan et al., "MCMC-based Particle Filtering for Tracking a Variable Number of Interacting Targets," IEEE Transactions on Pattern Analysis and Machine Intelligence, 27(11): 2005, 15 pages.
Krull et al., "6-DOF Model Based Tracking via Object Coordinate Regression," Asian Conference on Computer Vision, 2014, 16 pages.
Krull et al., "Learning Analysis-by-Synthesis for 6D Pose Estimation in RGB-D Images," IEEE International Conference on Computer Vision, 2015, 9 pages.
Kwok et al., "Map-based Multiple Model Tracking of a Moving Object," RoboCup 2004: Robot Soccer World Cup VIII, vol. 3276, 2004, 16 pages.
Li et al., "Real-time and Model-free Object Tracking Using Particle Filter with Joint Color-spatial Descriptor," IEEE/RSJ International Conference on Intelligent Robots and Systems, 2015, 7 pages.
Liebelt et al., "Viewpoint-Independent Object Class Detection using 3D Feature Maps," IEEE Conference on Computer Vision and Pattern Recognition, 2008, 9 pages.
Lin et al., "Focal Loss for Dense Object Detection," ICCV, 2017, 9 pages.
Lin et al., "Microsoft COCO: Common Objects in Context," European Conference on Computer Vision, Jul. 5, 2014, 14 pages.
Liu et al., "SSD: Single Shot Multibox Detector," European Conference on Computer Vision, 2016, 17 pages.
Markley et al., "Averaging Quaternions," Journal of Guidance, Control, and Dynamics, 30(4): 2007, 10 pages.
Montemerlo et al., "FastSLAM: A Factored Solution to the Simultaneous Localization and Mapping Problem," AAAI, 2002, 10 pages.
Nummiaro et al., "Object Tracking with an Adaptive Color-based Particle Filter," Joint Pattern Recognition Symposium, 2002, 8 pages.
Oka et al., "Tracking 3D Pose of Rigid Object by Sparse Template Matching," International Conference on Image and Graphics, 2009, 8 pages.
Pauwels et al., "Real-time Model-based Rigid Object Pose Estimation and Tracking Combining Dense and Sparse Visual Cues," IEEE Conference on Computer Vision and Pattern Recognition, 2013, 8 pages.
Pavlakos et al., "6-DoF Object Pose from Semantic Keypoints," IEEE International Conference on Robotics and Automation, Mar. 14, 2017, 8 pages.
Redmon et al., "You Only Look Once: Unified, Realtime Object Detection," Proceedings of the IEEE Conference on Computer Vision and Pattern Recognition, 2016, 10 pages.
Rothganger et al., "3D Object Modeling and Recognition Using Local Affine-invariant Image Descriptors and Multiview Spatial Constraints," International Journal of Computer Vision, 66(3): 2006, 49 pages.
Shan et al., "Real Time Hand Tracking by Combining Particle Filtering and Mean Shift," IEEE International Conference on Automatic Face and Gesture Recognition, 2004, 6 pages.
Simonyan et al., Very Deep Convolutional Networks for Large-Scale Image Recognition, Dec. 23, 2014, 13 pages.
Srivatsan et al., "Bingham Distribution-based Linear Filter for Online Pose Estimation," Robotics: Science and Systems, 2017, 10 pages.
Sundermeyer et al., "Implicit 3D Orientation Learning for 6D Object Detection from RGB Images," ECCV, 2018, 17 pages.
Säkkä et al., "Rao-Blackwellized Particle Filter for Multiple Target Tracking," Information Fusion, 8(1): 2007, 33 pages.
Tekin et al., "Real-Time Seamless Single Shot 6D Object Pose Prediction," CVPR, 2018, 10 pages.
Tremblay et al., "Deep Object Pose Estimation for Semantic Robotic Grasping of Household Objects," Conference on Robot Learning, Sep. 27, 2018, 11 pages.
Xiang et al., "Monocular Multiview Object Tracking with 3D Aspect Parts," European Conference on Computer Vision, 2014, 16 pages.
Xiang et al., "PoseCNN: A Convolutional Neural Network for 6D Object Pose Estimation in Cluttered Scenes," May 26, 2018, 10 pages.
Zeng et al., "Multi-view Self-Supervised Deep Learning for 6D Pose Estimation in the Amazon Picking Challenge," IEEE International Conference on Robotics and Automation, May 7, 2017, 8 pages.
Deng et al., "PoseRBPF: A Rao-Blackwellized Particle Filter for 6D Object Pose Tracking," May 22, 2019, retreived Oct. 22, 2020, from https://arxiv.org/pdf/1905.09304.pdf, 10 pages.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

(56) References Cited

OTHER PUBLICATIONS

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
Wikipedia, "IEC 61508," Wikipedia Encyclopedia, retrieved on Oct. 13, 2020, from https://en.wikipedia.org/wiki/IEC_61508, 7 pages.
Wikipedia, "ISO 26262," Wikipedia Encyclopedia, retrieved on Oct. 13, 2020, from https://en.wikipedia.org/wiki/ISO_26262, 8 pages.

* cited by examiner

OBJECT POSE ESTIMATION

BACKGROUND

Object recognition and tracking is an important problem in the field of image processing. In various embodiments, for example, object recognition may be used in robotic control systems, autonomous vehicle control, visual search systems, and object tracking applications. In an embodiment, tracking an object may include determining a location or orientation of an object. In an embodiment, both location and orientation may be used. In an embodiment, a 3-D position and a corresponding 3-D orientation of an object (called the 6D pose) may be determined from an image. In an embodiment, the 6D pose of the object may be estimated using local-feature or template-matching techniques, where features extracted from an image are matched against features or viewpoint templates generated for the 3-D model of the object. In an embodiment, the 6D object pose can then be recovered using 2-D/3-D correspondences of these local features or by selecting the best matching viewpoint onto the object. In an embodiment, machine learning techniques may be employed to detect key points or to learn better image features for matching, resulting in a significant boost to estimation accuracy and robustness. In an embodiment, however, despite these advances, the 6D pose of symmetrical and semi-symmetrical is difficult due to ambiguity in the available image, and many current systems struggle to maintain acceptable accuracy. Therefore, methods and systems capable of determining improved 6D pose information are needed.

BRIEF DESCRIPTION OF THE DRAWINGS

Various techniques will be described with reference to the drawings, in which.

DETAILED DESCRIPTION

Figure 1:
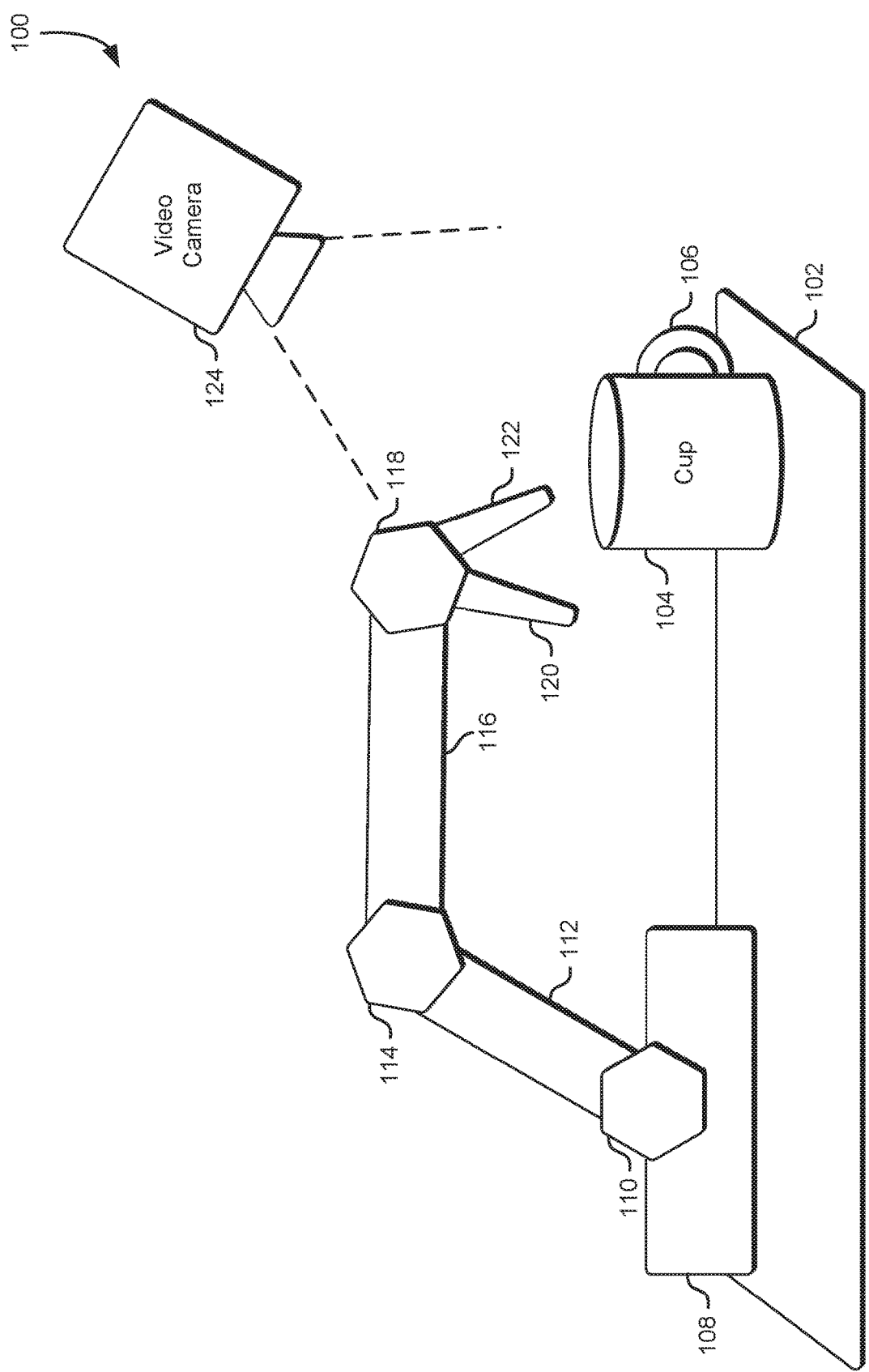
FIG. 1 illustrates an example of a robotic system that determines the 6D pose of an object using image information obtained from a video camera, in accordance with an embodiment.

The present document describes a system and method that determines the 6D pose of an object from an image. In an embodiment, the system (referred to herein as PoseRBPF) includes a Rao-Blackwellized particle filter for tracking 6D object poses. In an embodiment, each particle samples 3-D translation and estimates the distribution over 3-D rotations conditioned on the image bounding box corresponding to the sampled translation. In an embodiment, the system compares each bounding box embedding to learned viewpoint embeddings to efficiently update the distributions over time. In an embodiment, the tracked distributions capture both the uncertainties caused by the symmetry of objects and the uncertainty caused by object pose. In an embodiment, experiments indicate that the system provides superior performance when determining the pose of household objects and symmetric non-textured industrial objects.

In an embodiment, the system is initialized by a pose detection framework. In an embodiment, the system provides global pose estimation, thereby overcoming the need for an initialization approach. In an embodiment, the system samples particles uniformly over the first frame and then refines this estimate over consecutive frames. In an embodiment depth information from RGB-D or stereo cameras is used to further boost the accuracy of pose estimates. In an embodiment, the pose uncertainties modeled by the system are used to improve active sensing. In an embodiment, the system analyzes the distributions resulting from a codebook matching approach to automatically detect symmetries. In an embodiment, the system is able to automatically detect the rotational symmetry of a bowl which, for example, allows the system to avoid estimating a bowl's azimuth.

In an embodiment, the system produces a 6D pose estimation in the form of a distribution refined over a plurality of ordered images, such as frames of a video stream. In an embodiment, in various fields such as robotics, temporal data and information about the uncertainty of estimates is very important for tasks such as grasp planning or active sensing. In an embodiment, temporal tracking in video data can improve pose estimation in the context of point-cloud based pose estimation, and provide an improvement over unimodal estimates that fail to adequately represent the complex uncertainties arising from occlusions and possible object symmetries.

The present document describes a particle-filter based approach to estimate full posteriors over 6D object poses, in an embodiment. In an embodiment the pose estimation techniques described herein factorize the posterior into the 3-D translation and the 3-D rotation of the object, and use a Rao-Blackwellized particle filter that samples object poses and estimates discretized distributions over rotations for each particle. In an embodiment, to achieve accurate estimates, the 3-D rotation is discretized at a 5 degree resolution, resulting in a distribution over 72×37×72=191, 808 bins for each particle (elevation ranges only from −90 to 90 degree). In an embodiment, to achieve real time performance, the pose estimation system pre-computes a codebook over embeddings for all discretized rotations, where embeddings come from an autoencoder network trained to encode the visual appearance of an object from arbitrary viewpoints at a certain scale. In an embodiment, for each particle, the pose estimation system uses the 3-D translation to determine the center and size of the object bounding box in the image, determines the embedding for that bounding box, and finally updates the rotation distribution by comparing the embedding value with the pre-computed entries in the codebook using cosine distance. In an embodiment, the weight of each particle is given by the normalization factor of the rotation distribution. In an embodiment, motion updates are performed by sampling from a motion model over poses and a convolution over the rotations.

In an embodiment, tracking 6D poses of objects from videos provides rich information to a robot in performing different tasks such as manipulation and navigation. In an embodiment, the pose estimation techniques described herein formulate the 6D object pose tracking problem in the Rao-Blackwellized particle filtering framework, where the 3-D rotation and the 3-D translation of an object are decoupled. In an embodiment, this factorization allows the pose estimation techniques described herein to estimate the 3-D translation of an object and the full distribution over the 3-D rotation. In an embodiment, this is achieved by discretizing the rotation space in a fine-grained manner, and training an autoencoder network to construct a codebook of feature embeddings for the discretized rotations. In an embodiment, as a result, the pose estimation techniques described herein can track objects with arbitrary symmetries while still maintaining adequate posterior distributions. In an embodiment, the pose estimation techniques described herein achieve state-of-the-art results on two 6D pose estimation benchmarks. In an embodiment, estimating the 6D pose of objects from camera images, i.e., 3-D rotation and 3-D translation of an object with respect to the camera, is an important problem in robotic applications. For example, in robotic manipulation, 6D pose estimation of objects provides critical information to the robot for planning and executing grasps, in an embodiment. In an embodiment involving robotic navigation tasks, localizing objects in 3-D provides useful information for semantic planning and obstacle avoidance.

As one skilled in the art will appreciate in light of this disclosure, certain embodiments may be capable of achieving certain advantages, including some or all of the following: (1) the 6D pose estimation techniques described herein provide a framework that combines Rao-Blackwellized particle filtering with a learned autoencoder network in an efficient and principled way; (2) the 6D pose estimation techniques described herein are able to track full distributions over 6D object poses for objects with arbitrary kinds of symmetries, without the need for manual symmetry labeling.

In an embodiment, the pose-estimation techniques described herein factorize the 6D object pose tracking problem and utilize Rao-Blackwellized particle filters, which scale to complex estimation problems. In an embodiment, the techniques employ a deep neural network as an observation model that provides robust estimates for object orientations even under occlusions and symmetries. In an embodiment, the techniques allow the evaluation of many possible orientations in parallel using an efficient GPU implementation, and therefore are able to track the distribution of the 6D pose of an object at a rate superior to present methods.

FIG. 1 illustrates an example of a robotic system that determines the 6D pose of an object using image information obtained from a video camera, in accordance with an embodiment. In an embodiment, a system 100 includes a robot that interacts with a cup 104 placed on a surface 102. In an embodiment, the cup 104 includes a handle 106. In an embodiment, the cup 104 is a semi-symmetrical object that, depending on the view point, may have an orientation that cannot be determined exactly. In an embodiment, for example, if the handle 106 is not visible, the cup may have a range of possible rotational orientations. In an embodiment, a robotic arm is directed to manipulate the cup 104. In an embodiment, control of the robotic arm is directed by a control system. In an embodiment, the control system is a computer system configured with executable instructions stored in memory that, as a result of being executed by one or more processors of the computer system, cause the computer system to command actuators that control the position of the joints of the robot.

In an embodiment, the robot is constructed on a base 108 that sits on the surface 102. In an embodiment the robot includes a first articulated joint 110 that connects the base 108 to a first arm 112. In an embodiment, a second joint 114 connects the first arm 112 to a second arm 116. In an embodiment, a third joint 118 connects the second arm 116 to a pair of jaws 120, 122, probe, mechanical hand, or tool. In an embodiment, the articulated joints include pneumatic, hydraulic, or electric actuators that control the position of the joints. In an embodiment, the actuators accept control signals from a controlling computer system, which directs the robot to perform tasks. In an embodiment, the tasks may be object placement tasks, object capture tasks, navigation tasks, or other tasks.

In an embodiment, the controlling computer system uses position information about the object to perform the task. In an embodiment, the position information may include translation information and/or orientation (rotation) information. In an embodiment, the position information is a 3-dimensional translation and a 3-axis rotation, called a 6D pose.

In an embodiment, the 6D pose is determined using an image obtained from a video camera 124. In an embodiment, a sequence of images is used to determine the 6D pose of the object.

Figure 2:
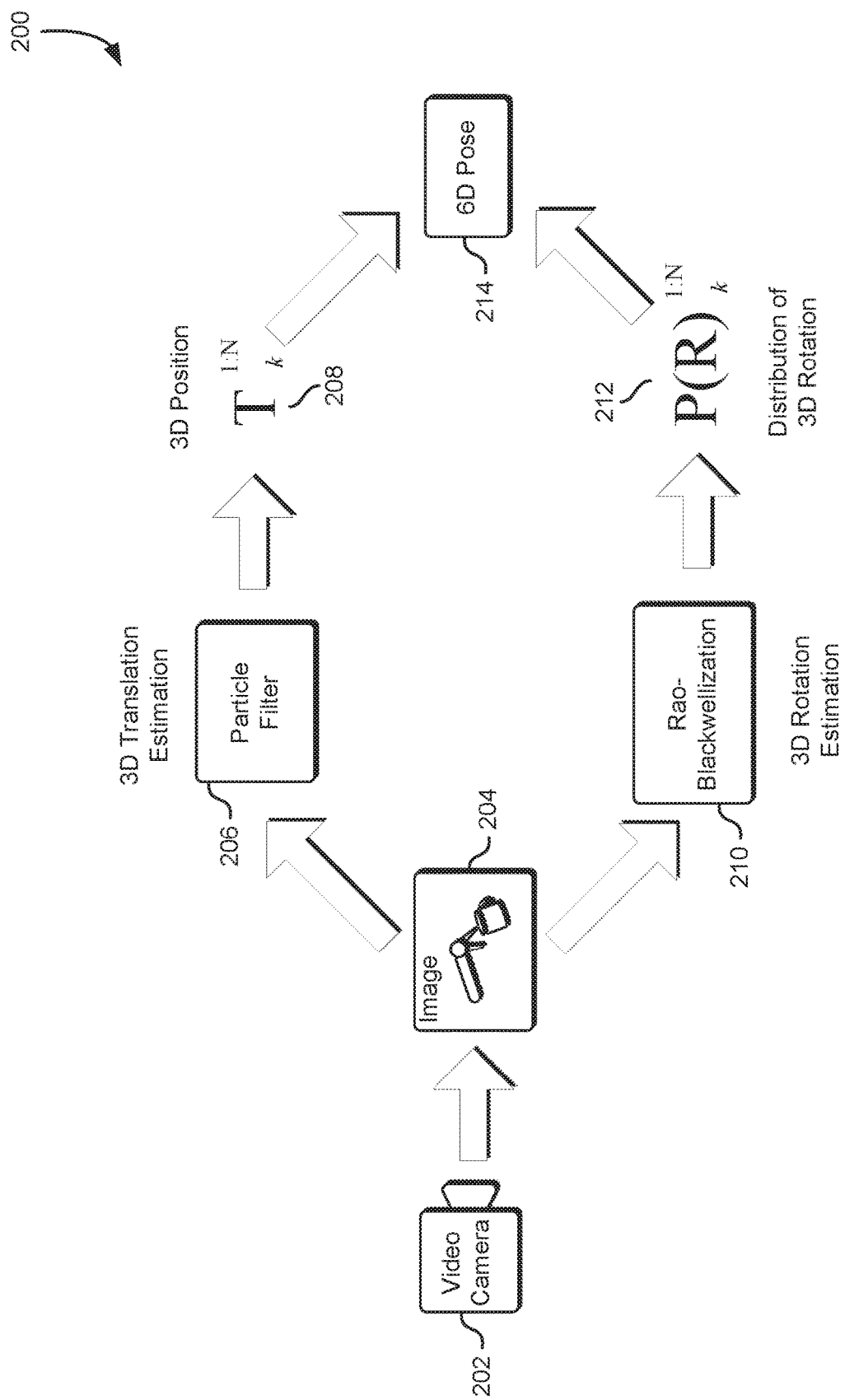
FIG. 2 illustrates an example of a process that determines the 6D pose of an object by combining a 3-D position and a 3-D rotation, in accordance with an embodiment.

FIG. 2 illustrates an example of a process 200 that determines the 6D pose of an object by combining a 3-D position and a 3-D rotation, in accordance with an embodiment. In an embodiment, a video camera 202 captures an image 204 of an object to be manipulated by a robot. In an embodiment, the image 204 may be a frame of a video stream or a single image captured with a camera. In an embodiment, the image is provided to a particle filter 206 which estimates the 3-D position 208 of the object. In an embodiment, the particle filter 206 uses a previous image or previous frame of the video stream in addition to the image 204 to inform the estimation process.

In an embodiment, the image 204 is processed using a second Rao-Blackwellized particle filter that estimates a distribution of the three-dimensional rotation 212 of the object. In an embodiment, the system uses an autoencoder to compare the image 204 to a codex to identify likely orientations for the object. The estimate of the 3-D position 208 and the distribution of the three-dimensional rotation 212 are combined to produce a 6D pose 214. In an embodiment, the 6D pose includes a full distribution of possible orientations for the object, which allows the pose-estimation techniques to be used on symmetrical and semi-symmetrical objects as well as asymmetric objects.

Figure 3:
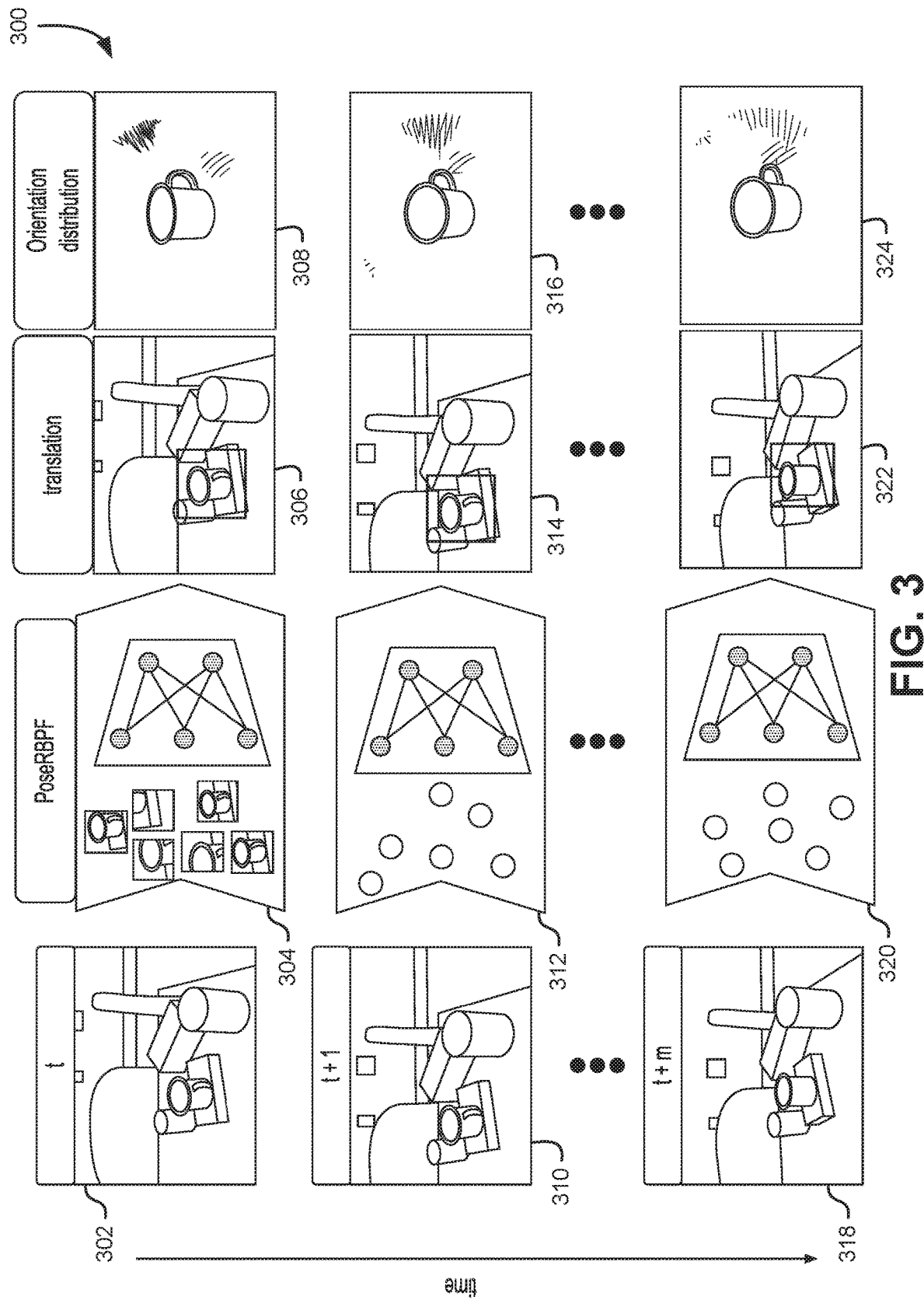
FIG. 3 illustrates an example of a 6D pose tracking process that uses a Rao-Blackwellized particle filter and an autoencoder network, in accordance with an embodiment.

FIG. 3 illustrates an example of a 6D pose tracking process that uses a Rao-Blackwellized particle filter and an autoencoder network, in accordance with an embodiment. In an embodiment, the process illustrated in FIG. 3 is performed by a computer system configured with executable instructions. In an embodiment, the computer system includes one or more processors such as those illustrated in FIGS. 12-16. In an embodiment, at time t, a computer system executes instructions that cause the computer system to determine a 6D pose of an object. In an embodiment, the 6D pose is determined from a first image 302 obtained from a camera or video camera. In an embodiment, the image is processed using a Rao-Blackwellized particle filter ("PoseRBPF") that includes an autoencoder network. In an embodiment, PoseRBPF produces a three-dimensional translation 306 and a distribution of possible orientations 308 for the object. In an embodiment, the distribution of possible orientations indicates a set of orientations that are possible for a symmetric or semi-symmetric object.

In an embodiment, a subsequent image 310 is obtained by the system. In an embodiment, the subsequent image 310 is processed using PoseRBPF 312 to produce an updated translation 314 and updated distribution of possible orientations 316. In an embodiment, the updated translation 314 is based at least in part on the previous translation information 306, and the updated distribution of possible orientations 316 is based on the distribution of possible orientations 308. In an embodiment, as the orientation of the object changes relative to the viewpoint of the camera with which the image was obtained, the orientation of semi-symmetric objects can be resolved as asymmetric features become visible. In an embodiment, combined with an appropriate model of rotational movement, subsequent image frames such as image 318 can be processed by PoseRBPF 320 to produce a translation 322 and the distribution of possible orientations 324 that is less ambiguous by relying on previous distributions of the object orientation. In an embodiment, PoseRBPF leverages a Rao-Blackwellized particle filter and an autoencoder network to estimate a 3-D translation and a full distribution of the 3-D rotation of a target object from a video sequence.

In an embodiment, a particle filter-based approach is used to estimate full posteriors over 6D object poses. In an embodiment, the system factorizes the posterior into the 3-D translation and the 3-D rotation of the object, and uses a Rao-Blackwellized particle filter that samples object poses and estimates discretized distributions over rotations for each particle. In an embodiment, to achieve accurate estimates, the 3-D rotation is discretized at a 5-degree resolution, resulting in a distribution over 72×37×72=191,808 bins for each particle (elevation ranges only from −90 to 90 degree). In an embodiment, real time performance is achieved by pre-computing a codebook over embeddings for all discretized rotations, where embeddings come from an autoencoder network trained to encode the visual appearance of an object from arbitrary viewpoints at a certain scale. In an embodiment, for each particle, the pose-estimation techniques described herein first use the 3-D translation to determine the center and size of the object bounding box in the image, then determine the embedding for that bounding box, and finally update the rotation distribution by comparing the embedding value with the pre-computed entries in the codebook using cosine distance. In an embodiment, the weight of each particle is given by the normalization factor of the rotation distribution. In an embodiment, motion updates are performed by sampling from a motion model over poses and a convolution over the rotations. In an embodiment, experiments on the YCB-Video dataset and the T-Less dataset show that the pose-estimation techniques described herein are able to represent uncertainties arising from various types of object symmetries and can provide more accurate 6D pose estimation.

In an embodiment, the pose-estimation techniques described herein provide the following features: a novel 6D object pose estimation framework that combines Rao-Blackwellized particle filtering with a learned autoencoder network in an efficient and principled way; and a framework that is able to track full distributions over 6D object poses. The system can determine a 6D pose for objects with arbitrary kinds of symmetries without the need for manual symmetry labeling.

In an embodiment, in addition to the 6D object pose estimation, the pose-estimation techniques described herein provide a measure of the uncertainty of the estimation for decision making and avoiding catastrophic accident. In an embodiment, a particle filter provides a suitable framework for tracking the 6D pose of an object and the uncertainty of estimation because there is no need to for assuming the probability distribution of the states. In an embodiment, this property enables tracking the uncertainty of the symmetric objects, whose rotation uncertainty distribution can be multi-modal. In an embodiment, one advantage of using particle filtering for 6D object pose tracking is that the particles are independent to each other, and therefore the evaluation of particles can be parallelized and significantly accelerated by a Graphic Processing Unit (GPU) or other processor such as those described below and shown in FIGS. 12-16.

In an embodiment, the pose-estimation techniques described herein estimate the 3-D rotation R and the 3-D translation T of an object for each frame in a video stream. In an embodiment, the techniques described herein frame the 6D object tracking problem in a particle filtering network, and utilize a deep neural network to compute the likelihood of the particles and to achieve an efficient sampling strategy for tracking.

In an embodiment, at time step k, given observations $Z_{1:k}$ up to time k, our primary goal is to estimate the posterior distribution of the 6D pose of an object $P(R_k, T_k | Z_{1:k})$, where $R_k$ and $T_k$ denote the 3-D rotation and 3-D translation of the object at time k, respectively. In an embodiment, the pose-estimation techniques described herein provide superior performance over using a particle filter to sample over the 6D space, especially when there is large uncertainty over an object's orientation. For example, such uncertainties may be present when objects are significantly occluded within the image or have symmetries that result in multiple orientation possibilities. In an embodiment, the pose-estimation techniques described herein factorize the 6D estimation into 3-D rotation and 3-D translation estimation. In an embodiment, 3-D translation is estimated from the location and size of the object in the image. In an embodiment, the translation provides the center and scale for the object's bounding box in the image, based on which the 3-D rotation can be estimated from the appearance of the object in the bounding box. In an embodiment, the posterior is decomposed into:

$$P(R_k, T_k | Z_{1:k}) = P(T_k | Z_{1:k}) P(R_k | T_k, Z_{1:k}),$$

where $P(T_k | Z_{1:k})$ encodes the location and scale of the object in the image, and $P(R_k | T_k, Z_{1:k})$ models the rotation distribution conditioned on the translation and the image.

In an embodiment, this factorization directly leads to an efficient sampling scheme for a Rao-Blackwellized particle filter, where the posterior at time k is approximated by a set of N weighted samples $\chi_k = \{T_k^i, P(R_k)^i, w_k^i\}_{i=1}^N$. Here, $T_k^i$ denotes the i-th particle's translation component, $P(R_k)^i$ the particle's discrete distribution over the object orientation, and $w_k^i$ the importance weight.

In an embodiment, to allow accurate estimates, the 3-D object orientation consisting of azimuth, elevation, and in-plane rotation is discretized into bins of size 5 degree, resulting in a distribution over 72×37·72=191, 808 bins for each particle (elevation ranges only from −90 to 90 degree).

In an embodiment, at a time step k, the particles are propagated through a motion model to generate the new set of particles $\chi_{k+1}$. The following describes an embodiment that computes the observation likelihoods necessary for the orientation estimates and the importance weights, in addition to a motion model.

In an embodiment, the observation likelihoods of the two posteriors $P(Z_k | T_k)$ and $P(Z_k, T_k | R_k)$ measure the compatibility of the observation $Z_k$ with the object pose at 3-D rotation $R_k$ and 3-D translation $T_k$. In an embodiment, if the system is able to synthetically generate an image of the object with the pose $(R_k, T_k)$ into the same scene as the observation $Z_k$, the system can compare the synthetic image with the input image $Z_k$ to measure the likelihoods. However, in various embodiments, this is not preferred since it may be difficult to synthesize the same lighting, background or even occlusions between objects as in the input video frame. In an embodiment, as an alternative, it is straightforward to render a synthetic image of the object using constant lighting, blank background and no occlusion, given the 3-D model of the object. In an embodiment therefore, the system applies an autoencoder to transform the observation $Z_k$ into the same domain as the synthetic rendering of the object. In an embodiment, the system compares image features in the synthetic domain to measure the likelihoods of 6D poses in a more efficient way.

Figure 4:
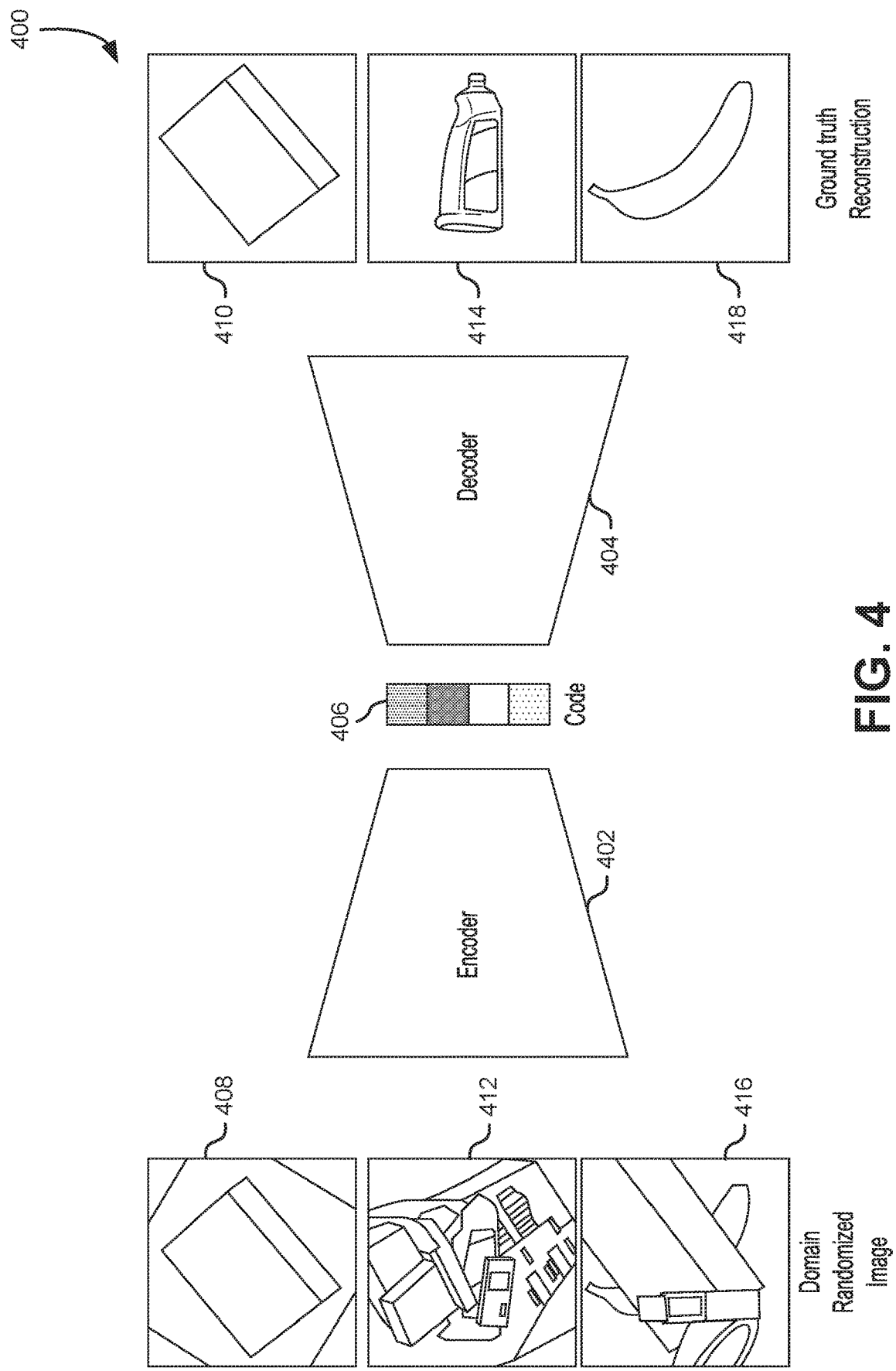
FIG. 4 illustrates an example of the inputs and outputs of an autoencoder used to determine the 6D pose of an object, in accordance with an embodiment.

FIG. 4 illustrates an example of the inputs and outputs of an autoencoder used to determine the 6D pose of an object, in accordance with an embodiment. In an embodiment, the autoencoder includes an encoder portion 402 and the decoder portion 404 and is controlled by a set of codes 406. In an embodiment, a set of codes is provided for each object type to be processed by the autoencoder. In an embodiment, code sets are maintained in a codebook that is pre-computed once and used during inference although, in other embodiments, the codebook may be dynamically updated based on the object detected in the image. In an embodiment, the set of codes 406 is set based on the object for which the orientation is to be determined. In an embodiment, the set of codes 406 allows the autoencoder to both identify an object in the image and identify a corresponding stock image. In an embodiment, the image input to the autoencoder may have different lighting, background, and occlusion features that obscure the object of interest. In an embodiment, the autoencoder identifies a synthetic image from a set of reconstructed images that illustrate various orientations of the object. In an embodiment, the encoder generates a feature embedding (or code) of the input image.

In an embodiment, an input image of a first object 408 is provided to the autoencoder and a first stock image 410 is identified by the autoencoder. In an embodiment, an input image of a second object 412 is provided to the autoencoder, and the autoencoder identifies a second stock image 414 that does not contain the occlusions of the source image. In an embodiment, an input image of the third object 416 is provided to the autoencoder, and the autoencoder identifies a third stock image 418 with a corresponding orientation that is not obscured.

In an embodiment, the autoencoder is trained to map an image Z of the target object with pose (R, T) to a synthetic image Z' of the object rendered from the same pose, where the synthetic image Z' is rendered using constant lighting, and there is no background and occlusion in the synthetic image. In an embodiment, the autoencoder maps images with different lighting, background and occlusion to the common synthetic domain. In an embodiment, the autoencoder learns a feature embedding f(Z) for the input image.

In an embodiment, the 3-D translation is fixed to a canonical one $T_0 = (0, 0, z)^T$, where z is a pre-defined constant distance. In an embodiment, the canonical translation indicates that the target object is in front of the camera with distance z. In an embodiment, the 3-D rotation R is uniformly sampled during training. In an embodiment, after training, for each discretized 3-D rotation $R^i$, a feature embedding $f(Z(R^i, T_0))$ is computed using the encoder, where $Z(R^i, T_0)$ denotes a rendered image of the target object from pose $(R^i, T_0)$. In an embodiment, the set of all the feature embeddings of the discretized 3-D rotations is denoted as the codebook of the target, and how to define the likelihoods using the codebook is described below.

In an embodiment, given a 3-D translation hypothesis $T_k$, the system crops a Region of Interest ("RoI") from the image $Z_k$, and then feeds the RoI into the encoder to compute the feature embedding of the RoI. In an embodiment, the 3-D translation $T_k = (x_k, y_k, z_k)^T$ is projected to the image to find the center $(u_k, v_k)$ of the RoI:

$$\begin{bmatrix} u_k \\ v_k \end{bmatrix} = \begin{bmatrix} f_x \dfrac{x_k}{z_k} + p_x \\ f_y \dfrac{y_k}{z_k} + p_y \end{bmatrix}$$

where $f_x$ and $f_y$ denote the focal lengths of the camera, and $(p_x, p_y)^T$ is the principal point. In an embodiment, the size of the RoI is determined by $$\dfrac{z_k}{z} s,$$

where z and s are the canonical distance and the RoI size in training the autoencoder, respectively. In an embodiment, each RoI is a square region, which makes the RoI independent from the rotation of the object.

In an embodiment, the RoI is fed into the encoder to compute the feature embedding $f(Z_k(T_k))$. In an embodiment, the pose estimation techniques described herein compute the cosine distance, which may also be referred to as the similarity, between the feature embedding of the RoI and a code in the codebook to measure the rotation likelihood:

$$P(Z_k, T_k \mid R_c^j) \propto g\left(\frac{f(Z_k(T_k)) \cdot f(Z(R_c^j, T_0))}{\|f(Z_k(T_k))\| \cdot \|f(Z(R_c^j, T_0))\|}\right)$$

where $R_c^j$ is one of the discretized rotations in the codebook, and $g(\cdot)$ is a Gaussian probability density function centered at the maximum cosine distance among all the codes in the codebook. In this way, a probabilistic likelihood distribution of all the rotations in the codebook is obtained.

Figure 5:
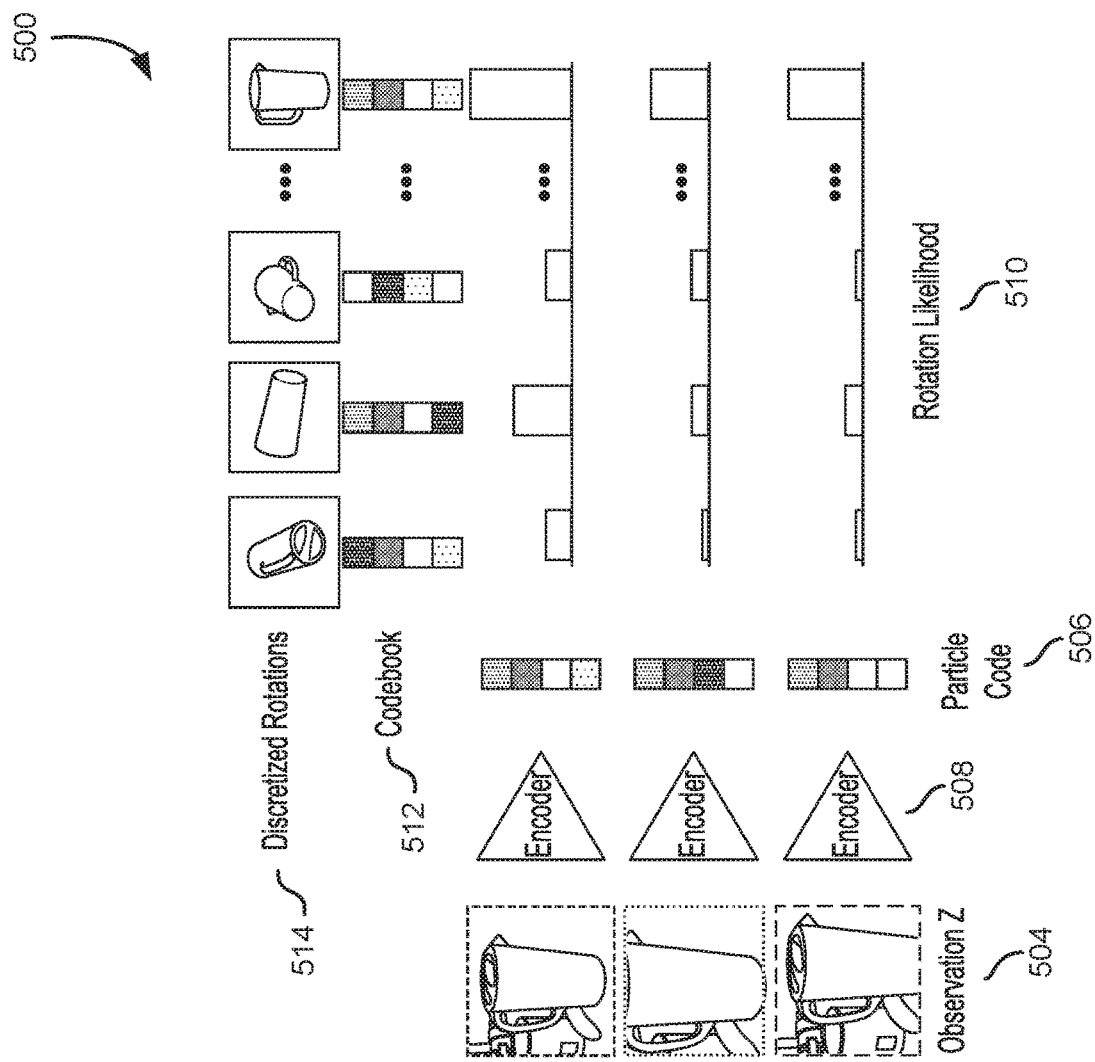
FIG. 5 illustrates an example of determining conditional rotation likelihood via codebook matching, in accordance with an embodiment.
Figure 5:
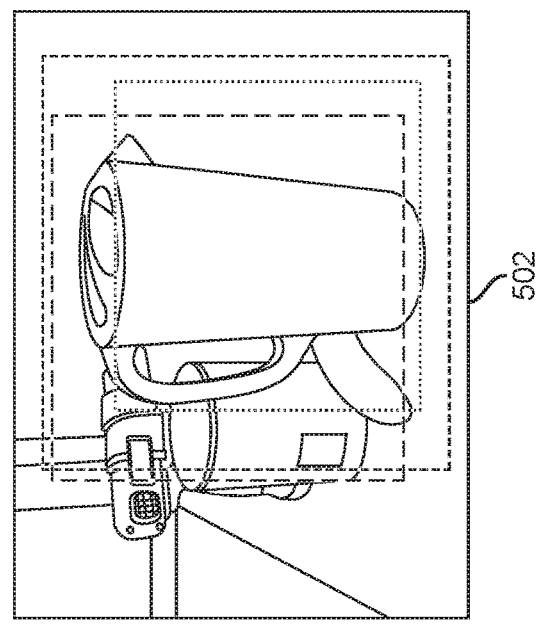

FIG. 5 illustrates an example of determining conditional rotation likelihood via codebook matching, in accordance with an embodiment. In an embodiment, each particle crops 502 the image based on its translation hypothesis. In an embodiment, the RoI for each particle is resized 504 and the corresponding code 506 is computed using the encoder 508. In an embodiment, the rotation likelihood P(Z,T|R) 510 is computed from the distance between the code 506 for each hypothesis and those in the codebook 512. In an embodiment, the codebook is generated from a set of discretized rotation images 514 that have standardized lighting, scaling, and no occlusions.

In an embodiment, the system decomposes translation and orientation. In an embodiment, each particle crops a region of interest ("ROI") from the image and computes the similarity score to all the different orientations. In an embodiment, in order to compute the similarity between the observation and the object rendered at that orientation and canonical translation, the system uses an encoder-decoder network to learn a latent code for the image by learning to reconstruct the whole object, even the occluded parts, and removing variations in lighting and color. In an embodiment, the system can handle symmetric objects where different poses result in the similar appearance and hence similar code from the network. In an embodiment, in order to train the network, objects are rendered at different poses and superimposed on random background images and random variations of color and lighting are applied. In an embodiment, in order to make the network more robust against occlusion, other objects are sampled at random poses. In an embodiment, if the primary object is excessively occluded, the network reconstructs a black image with no object being reconstructed.

In an embodiment, since the autoencoder is trained with the object being at the center of the image and at a certain scale, i.e., with the canonical translation $T_0$, a change in scale or deviation of the object from the center of the image may reduce the quality of the reconstruction. In an embodiment, particles with incorrect translations may generate RoIs where the object is not in the center of the RoI or with the wrong scale. In an embodiment, the pose estimation techniques described herein check the reconstruction quality of the RoI to measure the likelihood of the translation hypothesis. In an embodiment, this property is used to compute the translation likelihood $P(Z_k|T_k)$. In an embodiment, if the translation $T_k$ is correct, the similarity scores described above for rotation $R^i$ that is close to the ground truth rotation are high. In an embodiment, therefore, $P(Z_k|T_k)$ is defined as the mean of the top K similarity scores from the codebook matching (K=100 in the examples described below).

In an embodiment, a motion prior is used to propagate the distribution of the poses from the previous time step k−1 to the current time step k. In an embodiment, the pose estimation techniques described herein use a constant velocity model to propagate the probability distribution of the 3-D translation:

$$P(T_k|T_{k-1}) = \mathcal{N}(T_{k-1} + \alpha(T_{k-1} - T_{k-2}), \Sigma_T)$$

where $\mathcal{N}(\mu, \Sigma)$ denotes the multivariate normal distribution with mean p and covariance matrix E and a is a hyper-parameter of the constant velocity model. In an embodiment, the rotation prior is defined as a normal distribution with zero mean and fixed covariance variance $\Sigma_R$:

$$P(R_k|R_{k-1}) = \mathcal{N}(0, \Sigma_R)$$

where the rotation R is represented using Euler angles. In an embodiment, the rotation prior is implemented by a convolution on the previous rotation distribution with a 3-D Gaussian kernel.

In an embodiment, the tracking process is initialized from a 2D object detector. In an embodiment, given the first frame $Z_1$, the center of the 2D bounding box is backprojected to compute the (x, y) components of the 3-D translation and sample different zs to generate a set of translations. In an embodiment, the translation $T_1$ with the highest likelihood $P(Z_1|T)$ is used as initial hypothesis and $P(R|T_1, Z_1)$ as the initial rotation distribution.

Figure 6:
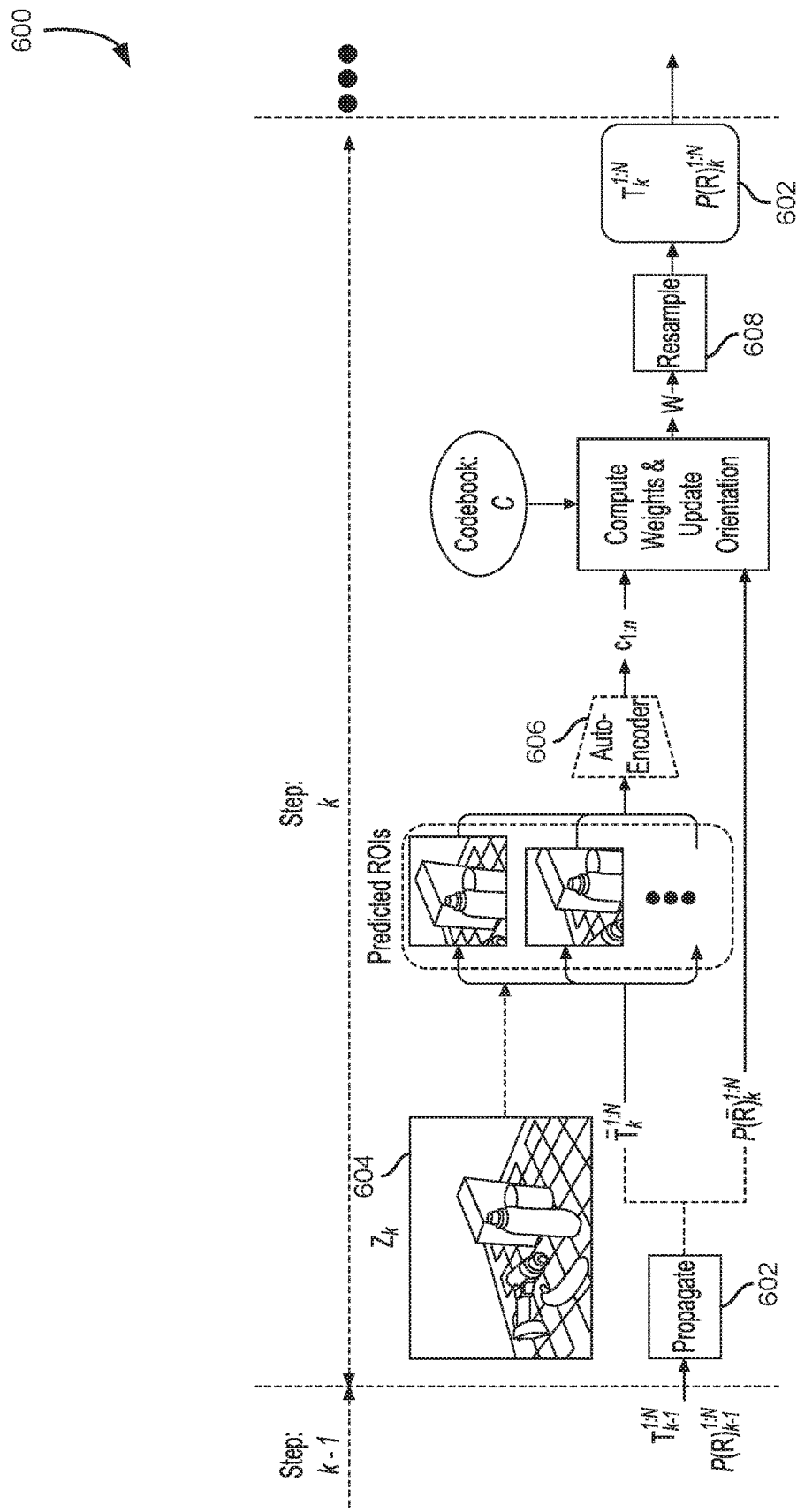
FIG. 6 illustrates an example of a Rao-Blackwellized particle filter where the particles are used to track the translation, and the orientation distribution is estimated through Rao-Blackwellization, in accordance with an embodiment.

FIG. 6 illustrates an example of a Rao-Blackwellized particle filter where the particles are used to track the translation, and the orientation distribution is estimated through Rao-Blackwellization, in accordance with an embodiment. In an embodiment, the particles are used to track the translation, while the orientation distribution is estimated through Rao-Blackwellization. In an embodiment, translation estimations are evaluated by evaluating the corresponding RoIs.

In an embodiment, at each following frame, the N particles are propagated 602 with the motion priors. Then the particles are updated with the latest observation $Z_1$. Specifically, for each particle, the translation estimation $T_k^i$ is used to compute the RoI of the object in image $Z_k$ 604. The resulting RoI is passed through the autoencoder 606 to compute the corresponding code. For each particle, the rotation distribution is updated with:

$$P(R_k)^i = \eta P(Z_k, T_k^i | R_k) P(R_k | R_{k-1}),$$

where $P(Z_k, T_k^i | R_k)$ is the rotation likelihood as defined above, $P(R_k|R_{k-1})$ is the motion prior, and η denotes a normalization constant. In an embodiment, the posterior of the translation is computed as the weight $w^i$ of this particle. In an embodiment, a systematic resampling method 608 is used to resample the particles according to the weights $w^{1:N}$.

In an embodiment, some robotic tasks use the expectation of the 6D pose of the object from the particle filter for decision making. In an embodiment, the expectation can be represented as $(T_k^E, R_k^E)$. The translation expectation can be computed using a weighted mean or, in some embodiments, simply by averaging the translation estimations $T_k^{1:N}$ for all the N particles. In an embodiment, computing the rotation expectation $R_k^E$ is less obvious since the distribution $P(R_k)^i$ might be multi-modal and simply performing weighted averaging over all the discrete rotations is not meaningful. In an embodiment, to compute the rotation expectation, the pose estimation techniques described herein summarize the rotation distribution for all the particles by taking the maximum probability for every discrete rotation, resulting in rotation distribution $P(R^E)_k$. In an embodiment, the rotation expectation $R_k^E$ is then computed by weighted averaging the discrete egocentric rotations within a neighborhood of the previous rotation expectation $R_{k-1}^E$.

In an embodiment, performing codebook matching with the estimated RoIs also provides a way to detect tracking failures. In an embodiment, the techniques described herein first find the maximum similarity score among all the particles, and then if the maximum score is lower than a pre-defined threshold, designate it as a tracking failure. In an embodiment, the following describes an example of a Rao-Blackwellized particle filter for 6D object pose tracking.

| Algorithm |
|---|
| Input: $Z_k$, $(T_{k-1}^{1:N}, P(R)_{k-1}^{1:N})$ |
| Output: $(T_k^{1:N}, P(R)_k^{1:N})$ |
| Begin { |
|   $\{w^i\}_{i=1}^N \leftarrow 0$ |
|   $(\overline{T_k^{1:N}}, P(\overline{R})_k^{1:N})$ = Propagate$(T_{k-1}^{1:N}, P(R)_{k-1}^{1:N})$ |
|   For $(\overline{T_k^i}, P(\overline{R})_k^i) \in (\overline{T_k^{1:N}}, P(\overline{R})_k^{1:N})$ do { |
|     $P(\overline{R})_k^i$ = Codebook_Match$(Z_k, \overline{T_k^i}) * P(\overline{R})_k^i$ ; |
|     $w^i$ = Evaluate $(Z_k, \overline{T_k^i}, P(\overline{R_k^i}))$ ; |
|   } End |
|   $(T_k^{1:N}, P(R)_k^{1:N})$ = Resample$(\overline{T_k^{1:N}}, P(\overline{R})_k^{1:N}, \{w^i\}_{i=1}^N)$ ; |
| } End |

In an embodiment, the pose-estimation techniques described herein are evaluated on two datasets: the YCB Video dataset and the T-LESS dataset. The YCB video dataset contains RGB-D video sequences of 21 objects from the YCB Object and Model Set. It contains textured and textureless household objects put in different arrangements. Objects are annotated with 6D object poses and two metrics are used for quantitative evaluation. The first metric is ADD, which is the average distance between the corresponding 3-D points on the object at ground truth pose vs. the predicted pose. The second metric is ADD-S, which is the average distance between the closest point between the 3-D model of the object at ground truth and the model of the object at the predicted pose. ADD-S is designed for symmetric objects, since it focuses on shape matching rather than exact pose matching.

The T-LESS dataset contains RGB-D sequences of 30 non-textured industrial objects. Evaluation is done on 20 test scenes. The objects do not have texture and they have various forms of symmetries and occlusions. The results follow the evaluation pipeline in SIXD challenge and used Visible Surface Discrepancy $err_{vsd}$ to evaluate the quality of the pose estimation. Visual surface discrepancy is computed as mean average of the distance between the visible points. The metric is the recall of correct 6D poses where $err_{vsd}$<0.3 with tolerance 20 mm and visibility of more than 10%.

TABLE I

Effect of the Number of Particles on Frame Rate in Tracking

| Number of Particles | 50 | 100 | 200 | 400 |
|---|---|---|---|---|
| Frame Rate | 20.3 | 11.5 | 6.1 | 3.1 |

TABLE II

Results on YCB Video Dataset

| objects | PoseCNN | | DOPE | | PoseRBPF 50 Particles | | PoseRBPF 200 Particles | | PoseRBFP++ 200 Particles | |
|---|---|---|---|---|---|---|---|---|---|---|
| | ADD | ADD-S | ADD | ADD-S | ADD | ADD-S | ADD | ADD-S | ADD | ADD-S |
| 002\_master\_chef\_can | 50.9 | 84.0 | — | — | 56.1 | 75.6 | 58.0 | 77.1 | 63.3 | 87.5 |
| 003\_cracker\_box | 51.7 | 76.9 | 55.9 | 69.8 | 73.4 | 85.2 | 76.8 | 87.0 | 77.8 | 87.6 |
| 004\_sugar\_box | 68.6 | 84.3 | 75.6 | 87.3 | 73.9 | 86.5 | 75.9 | 87.6 | 79.6 | 89.4 |
| 005\_tomato\_soup\_can | 66.0 | 80.9 | 61.5 | 76.3 | 71.1 | 82.0 | 74.9 | 84.5 | 73.0 | 83.6 |
| 006\_mustard\_bottle | 79.9 | 90.2 | 71.4 | 84.1 | 80.0 | 90.1 | 82.5 | 91.0 | 84.7 | 92.0 |
| 007\_tuna\_fish\_can | 70.4 | 87.9 | — | — | 56.1 | 73.8 | 59.0 | 79.0 | 64.2 | 82.7 |
| 008\_pudding\_box | 62.9 | 79.0 | — | — | 54.8 | 69.2 | 57.2 | 72.1 | 64.5 | 77.2 |
| 009\_gelatin\_box | 75.2 | 87.1 | — | — | 83.1 | 89.7 | 88.8 | 93.1 | 83.0 | 90.8 |
| 010\_potted\_meat\_can | 59.6 | 78.5 | 39.4 | 52.4 | 47.0 | 61.3 | 49.3 | 62.0 | 51.8 | 66.9 |
| 011\_banana | 72.3 | 85.9 | — | — | 22.8 | 64.1 | 24.8 | 61.5 | 18.4 | 66.9 |
| 019\_pitcher\_base | 52.5 | 76.8 | — | — | 74.0 | 87.5 | /5.3 | 88.4 | 63.7 | 82.1 |
| 021\_bleach\_cleanser | 50.5 | 71.9 | — | — | 51.6 | 66.7 | 54.5 | 69.3 | 60.5 | 74.2 |
| 024\_bowl | 6.5 | 69.7 | — | — | 26.4 | 88.2 | 36.1 | 86.0 | 28.4 | 85.6 |
| 025\_mug | 57.7 | 78.0 | — | — | 67.3 | 83.7 | 70.9 | 85.4 | 77.9 | 89.0 |
| 035\_power\_drill | 55.1 | 72.8 | — | — | 64.4 | 80.6 | 70.9 | 85.0 | 71.8 | 84.3 |
| 036\_wood\_block | 31.8 | 65.8 | — | — | 0.0 | 0.0 | 2.8 | 33.3 | 2.3 | 31.4 |
| 037\_scissors | 35.8 | 56.2 | — | — | 20.6 | 30.9 | 21.7 | 33.0 | 38.7 | 59.1 |
| 040\_large\_marker | 58.0 | 71.4 | — | — | 45.7 | 54.1 | 48.7 | 59.3 | 67.1 | 76.4 |

TABLE II-continued

Results on YCB Video Dataset

| objects | PoseCNN ADD | PoseCNN ADD-S | DOPE ADD | DOPE ADD-S | PoseRBPF 50 Particles ADD | PoseRBPF 50 Particles ADD-S | PoseRBPF 200 Particles ADD | PoseRBPF 200 Particles ADD-S | PoseRBFP++ 200 Particles ADD | PoseRBFP++ 200 Particles ADD-S |
|---|---|---|---|---|---|---|---|---|---|---|
| 051\_large\_clamp | 25.0 | 49.9 | — | — | 27.0 | 73.2 | 47.3 | 76.9 | 38.3 | 59.3 |
| 052\_extra\_large\_clamp | 15.8 | 47.0 | — | — | 50.4 | 68.7 | 26.5 | 69.5 | 32.3 | 44.3 |
| 061\_foam\_brick | 40.4 | 87.8 | — | — | 75.8 | 88.4 | 78.2 | 89.7 | 84.1 | 92.6 |
| ALL | 53.7 | 75.9 | — | — | 57.1 | 74.8 | 59.9 | 77.5 | 62.1 | 78.4 |

TABLE III

T-Less Results: Object recall for $e_{vsd}$ on Primesense Test Scenes

| | Without GT 2D BBs | | | With GT 2D BBs | |
|---|---|---|---|---|---|
| Object | SSD Alternative | RetinaNet Alternative | RetinaNet PoseRBPF | Alternative | Pose RBPF |
| 1 | 5.65 | 8.87 | 22.10 | 12.33 | 80.90 |
| 2 | 5.46 | 13.22 | 22.00 | 11.23 | 85.80 |
| 3 | 7.05 | 12.47 | 34.30 | 13.11 | 85.60 |
| 4 | 4.61 | 6.56 | 18.70 | 12.71 | 62.00 |
| 5 | 36.45 | 34.80 | 45.10 | 66.70 | 89.80 |
| 6 | 23.15 | 20.24 | 67.50 | 52.30 | 97.80 |
| 7 | 15.97 | 16.21 | 42.60 | 36.58 | 91.20 |
| 8 | 10.86 | 19.74 | 33.20 | 22.05 | 95.60 |
| 9 | 19.59 | 36.21 | 34.30 | 46.49 | 77.10 |
| 10 | 10.47 | 11.55 | 44.10 | 14.31 | 85.30 |
| 11 | 4.35 | 6.31 | 24.60 | 15.01 | 89.50 |
| 12 | 7.80 | 8.15 | 29.80 | 31.34 | 91.20 |
| 13 | 3.30 | 4.91 | 21.70 | 13.60 | 89.30 |
| 14 | 2.85 | 4.61 | 13.00 | 45.32 | 70.20 |
| 15 | 7.90 | 26.71 | 28.80 | 50.00 | 96.60 |
| 16 | 13.06 | 21.73 | 39.10 | 36.09 | 97.00 |
| 17 | 41.70 | 64.84 | 43.10 | 81.11 | 87.00 |
| 18 | 47.17 | 14.30 | 46.40 | 52.62 | 89.70 |
| 19 | 15.95 | 22.46 | 23.70 | 50.75 | 83.20 |
| 20 | 2.17 | 5.27 | 12.10 | 37.75 | 70.00 |
| 21 | 19.77 | 17.93 | 33.50 | 50.89 | 84.40 |
| 22 | 11.01 | 18.63 | 30.50 | 47.60 | 77.70 |
| 23 | 7.98 | 18.63 | 32.50 | 35.18 | 85.90 |
| 24 | 4.74 | 4.23 | 33.40 | 11.24 | 91.80 |
| 25 | 21.91 | 18.76 | 37.20 | 37.12 | 88.70 |
| 26 | 10.04 | 12.62 | 46.00 | 28.33 | 90.90 |
| 27 | 7.42 | 21.13 | 41.10 | 21.86 | 79.10 |
| 28 | 21.78 | 23.07 | 51.60 | 42.58 | 72.10 |
| 29 | 15.33 | 26.65 | 52.60 | 57.01 | 96.00 |
| 30 | 34.63 | 29.58 | 50.60 | 70.42 | 77.00 |
| Mean | 14.67 | 18.35 | 35.17 | 36.79 | 85.28 |

In an embodiment, the autoencoder is trained for each object separately for 150,000 iterations with batch size of 64 using the Adam optimizer with learning rate of 0.0002. In an embodiment, the autoencoder is optimized with the L2 loss on the N pixels with largest reconstruction errors. In an embodiment, larger Ns are more suitable for textured objects to capture more details. One embodiment uses N=2000 for textured objects and N=1000 for non-textured objects. In an embodiment, the training data is generated by rendering the object at random rotation and superimposed at random crops of the MS-COCO dataset at resolution 128×128. In addition to the target object, three additional objects are sampled at random locations and scales to generate training data with occlusions. In an embodiment, the target object is positioned at the center of the image and jittered with 5 pixels, the object is sampled uniformly at scales between 0.975 and 1.025 with random lighting. In an embodiment, color is randomized in HSV space and Gaussian noise is added to pixel values to reduce the gap between the real and synthetic data. In an embodiment, the images are rendered online for each training step to provide a more diverse set of training data. In an embodiment, the architecture of the network consists of four convolution layers with kernel sizes of [128, 128, 256, 256] respectively and a fully connected layer with size 512. In an embodiment, the codebook for each object is pre-computed offline and loaded during test time. In an embodiment, computation of observation likelihood is done efficiently on a GPU such as the GPU described below and shown in FIGS. 12-16. Table I shows the frame rate at which an embodiment of the pose estimation techniques described herein can process images.

Table II shows results on the objects in the YCB video dataset, for one embodiment. Table II illustrates a comparison of one embodiment of the techniques described herein (PoseRBPF) with PoseCNN and DOPE, both of which use RGB images for pose estimation. In an embodiment, PoseRBPF was initialized using PoseCNN at the first frame or after the object was heavily occluded. In an embodiment, on average, this happened only 1.03 times per sequence. One embodiment of the techniques described herein significantly improved the accuracy of 6D pose estimation when using 200 particles. Various embodiments of the pose estimation techniques described herein provide superior pose information for symmetric objects such as 024\_bowl and 061\_foam\_brick.

In an embodiment, in the context of robot localization, adding samples drawn according to the most recent observation improves localization performance. In an embodiment, the techniques described herein are modified by sampling 50\% of the particles around PoseCNN predictions and the other 50\% from the particles of the previous time step. This embodiment, called PoseRBPF++, further improves the pose estimation accuracy.

Table III presents results of an embodiment on the T-LESS dataset. In the T-LESS dataset, objects do not have texture and objects are occluded frequently in different frames. An embodiment of the techniques described herein are compared with other methods that use a similar autoencoder but do not use temporal information. Both ground truth bounding boxes and the detection output from Retina-Net are presented. The results suggest that in an embodiment, the recall for correct object poses almost doubles by tracking the object pose rather than just predicting object pose from single images. For the experiments on an embodiment with ground truth bounding boxes, rotation is tracked using the particle filter and translation is inferred from the scale of the ground truth bounding box and highlights the viewpoint accuracy. In an embodiment, recall increases significantly for all the methods and the particle filter consistently outperforms other methods, which shows the importance of temporal tracking for object pose estimation.

Figure 7:
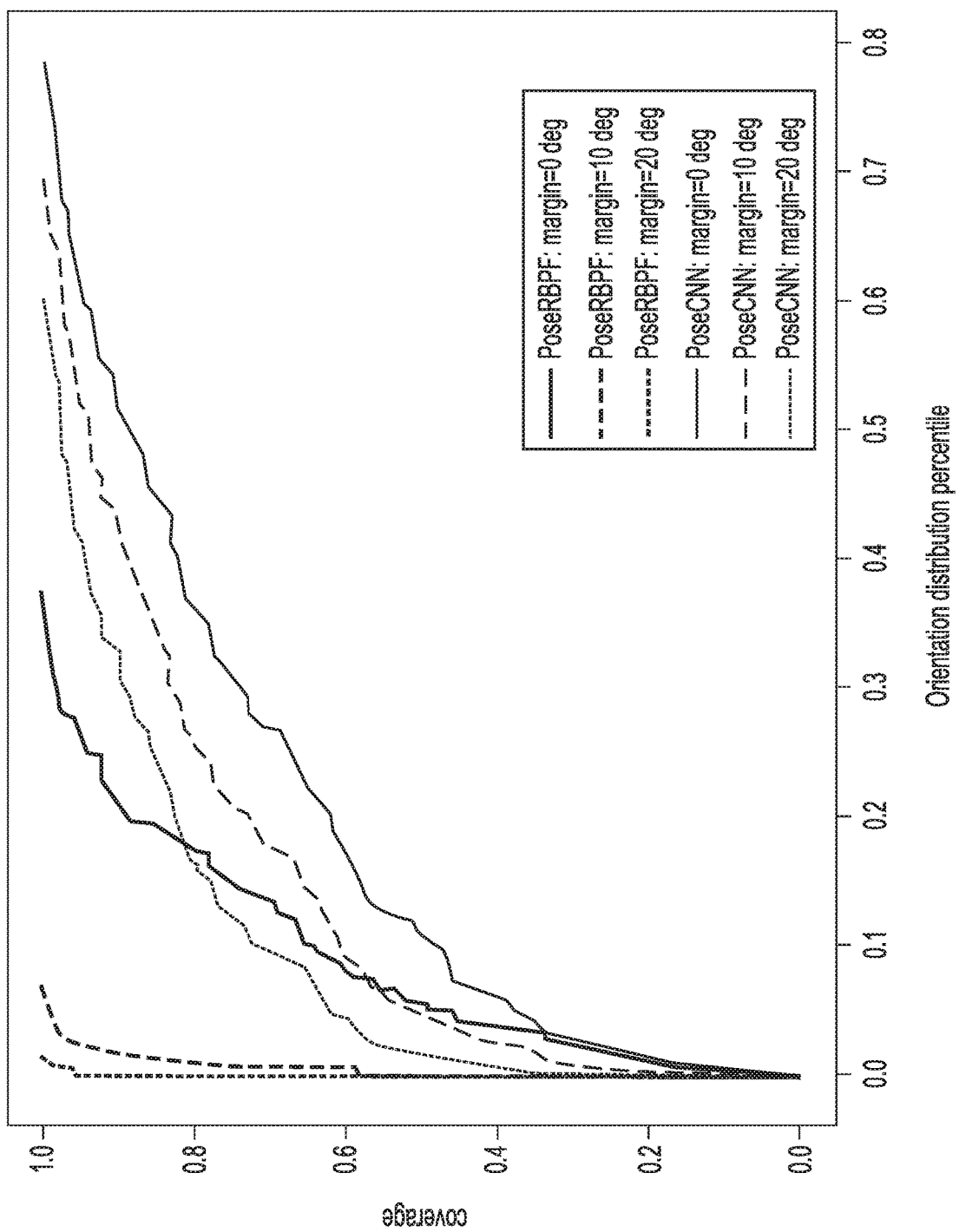
FIG. 7 illustrates an example of a rotation coverage percentile comparison for a scissors, in accordance with an embodiment.
Figure 7:
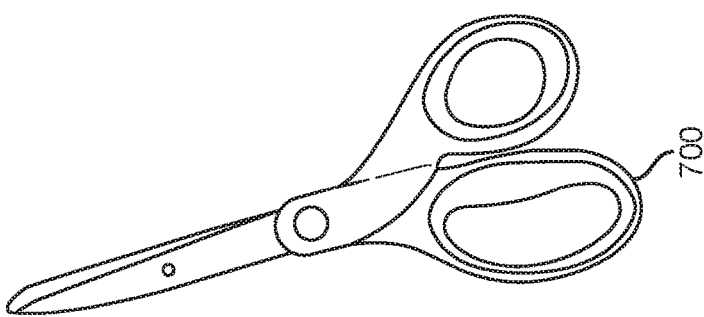

FIG. 7 illustrates an example of a rotation coverage percentile comparison for a scissors 700, in accordance with an embodiment. In an embodiment, the scissors 700 is an asymmetric object.

Figure 8:
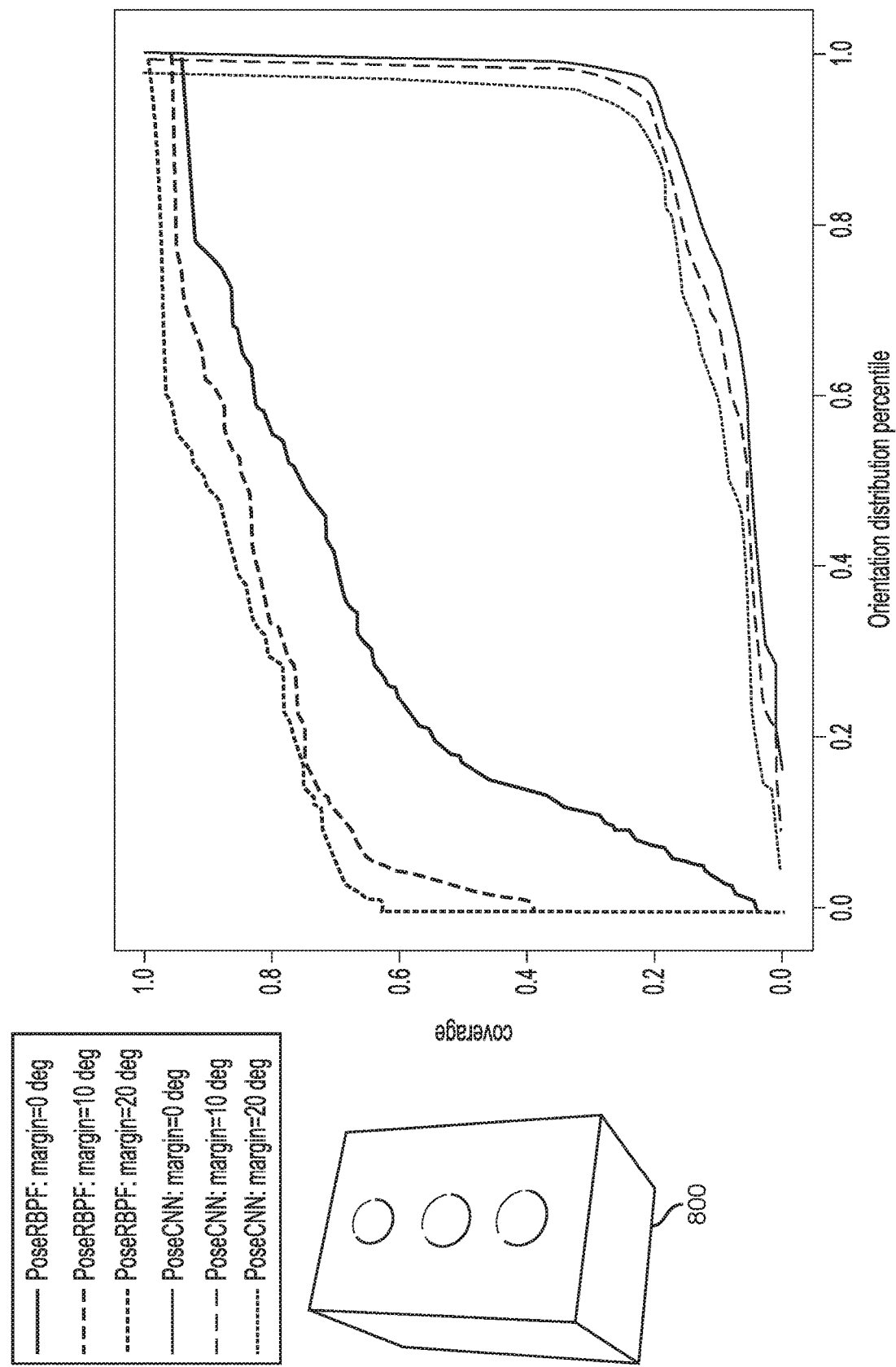
FIG. 8 illustrates an example of a rotation coverage percentile comparison for a foam brick, in accordance with an embodiment.

FIG. 8 illustrates an example of a rotation coverage percentile comparison for a foam brick 800, in accordance with an embodiment. In an embodiment, the foam brick 800 has symmetry with respect to 180-degree planar rotation.

Figure 9:
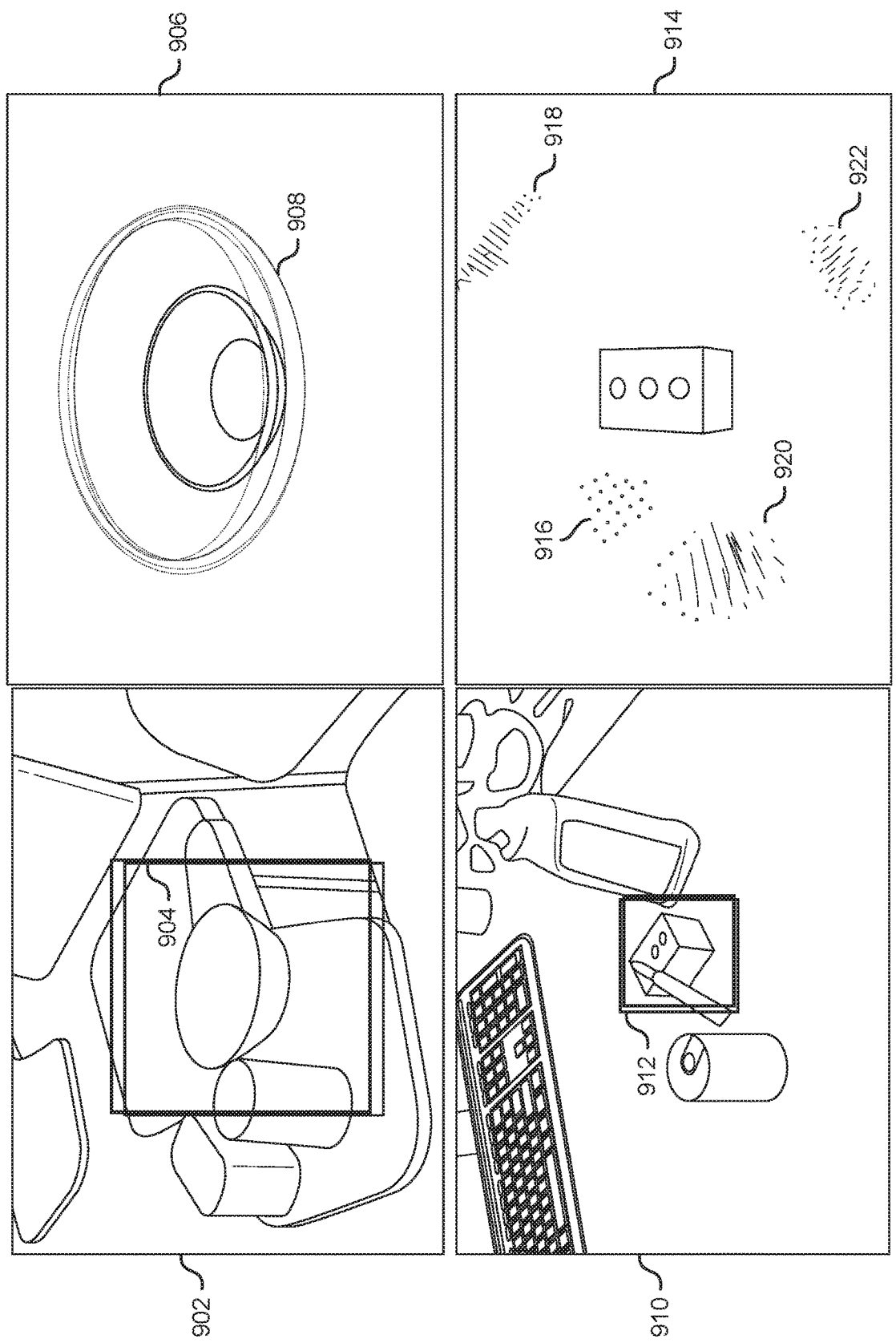
FIG. 9 illustrates an example of a visualization of a rotation distribution for a bowl, in accordance with an embodiment.

FIG. 9 illustrates an example of a visualization of a rotation distribution for a bowl and a brick, in accordance with an embodiment. In an embodiment, a first image 902 of the bowl includes a variety of other objects and may include variations in lighting and shading. In an embodiment, a bounding box 904 is identified that includes the bowl. In an embodiment, a second image 906 is a normalized image of the bowl. In the second image 906, a distribution of possible points of view 908 over the rotation is represented. In FIG. 9, the lines represent the probability for rotations that are higher than a threshold. The length of each line is proportional to the probability of that viewpoint.

In an embodiment, a third image 910 of the brick includes a variety of other objects, some of which partially obscure the brick. In an embodiment, a bounding box 912 is identified that includes the brick. In an embodiment, a fourth image 914 is a normalized image of the brick. In the fourth image 914, a distribution of possible points of view 916, 918, 920, and 922 over the rotation is represented.

In an embodiment, the pose estimation techniques described herein represent uncertainties due to various kinds of symmetries, including rotational symmetry of the bowl, and mirror symmetry of the foam brick. In an embodiment, the four clusters in the distribution show the possible symmetries of the brick.

Figure 10:
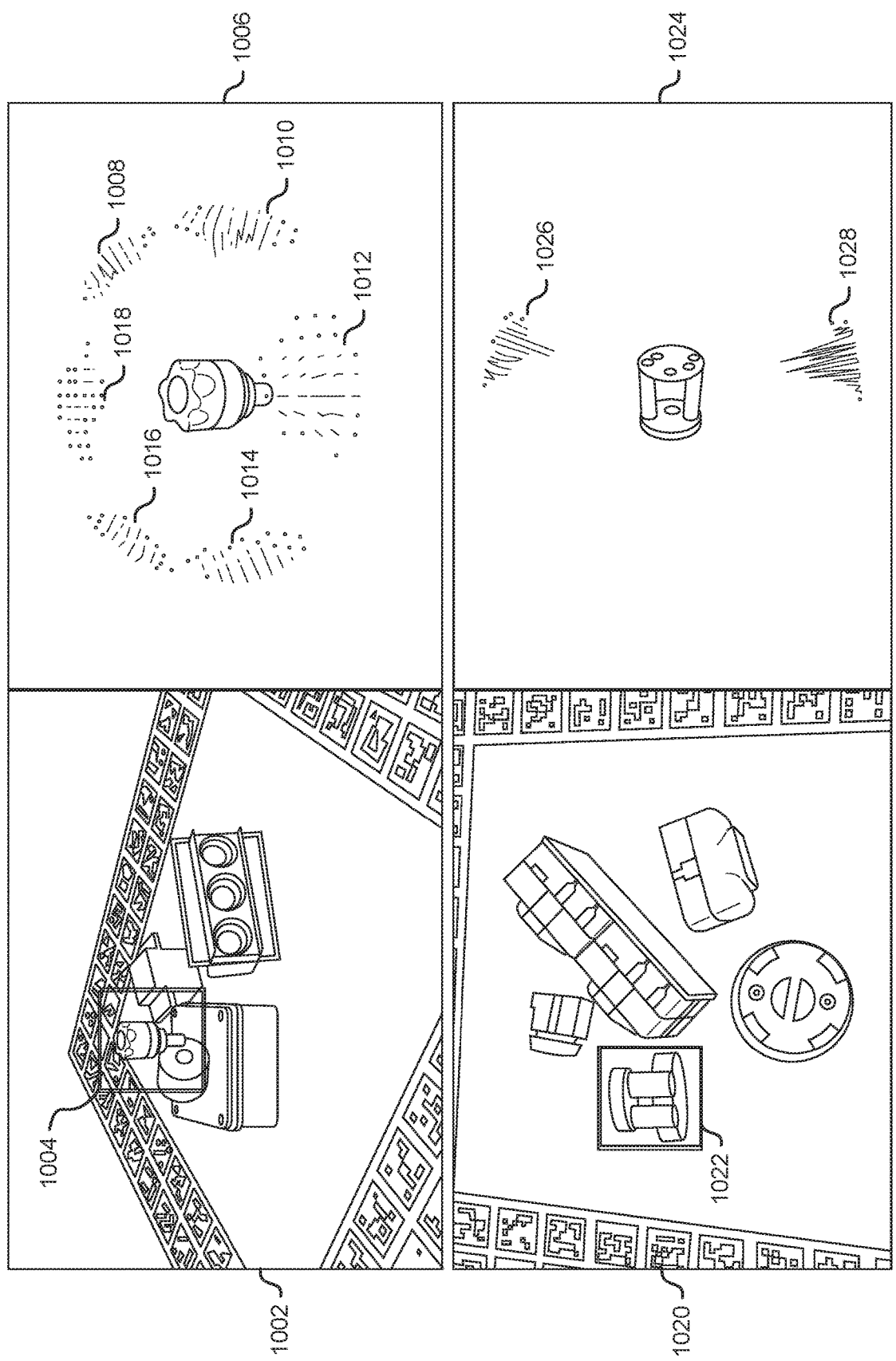
FIG. 10 illustrates an example of a visualization of a rotation distribution for a textureless object, in accordance with an embodiment.

FIG. 10 illustrates an example of a visualization of a rotation distribution for a semi-symmetrical object, in accordance with an embodiment. In an embodiment, a first image 1002 of a semi-symmetrical object includes a variety of other objects and may include variations in lighting and shading. In an embodiment, a bounding box 1004 is identified that includes the semi-symmetrical object. In an embodiment, a second image 1006 is a normalized image of the semi-symmetrical object. In the second image 1006, a distribution of possible points of view 1008, 1010, 1012, 1014, 1016, and 1018 over the rotation are represented. The semi-symmetrical object exhibits symmetry from six points of view, as illustrated by the distribution.

In an embodiment, a third image 1020 of a semi-symmetrical object includes a variety of other objects. In an embodiment, a bounding box 1022 is identified that includes the semi-symmetrical object. In an embodiment, a fourth image 1024 is a normalized image of the semi-symmetrical object. In the fourth image 1024, a distribution of possible points of view 1026 and 1028 over the rotation is represented. As can be seen, various embodiments of the techniques described herein naturally represent uncertainties due to various kinds of symmetries, including the discrete rotational symmetries of the semi-symmetrical objects illustrated in FIG. 10.

In an embodiment, the techniques described here produce full distributions over object rotations. FIG. 9 and FIG. 10 illustrate uncertainties in these distributions. In an embodiment, one source is the symmetry of the objects resulting in multiple poses with similar appearances. In an embodiment, each cluster of the viewpoints corresponds to one of the similarity modes. In an embodiment, the variance for each cluster corresponds to the true uncertainty of the pose. In an embodiment, for the bowl, each ring of rotations corresponds to the uncertainty around the azimuth because the bowl is a rotationally symmetric object, and different rings show the uncertainty on the elevation.

Figure 11:
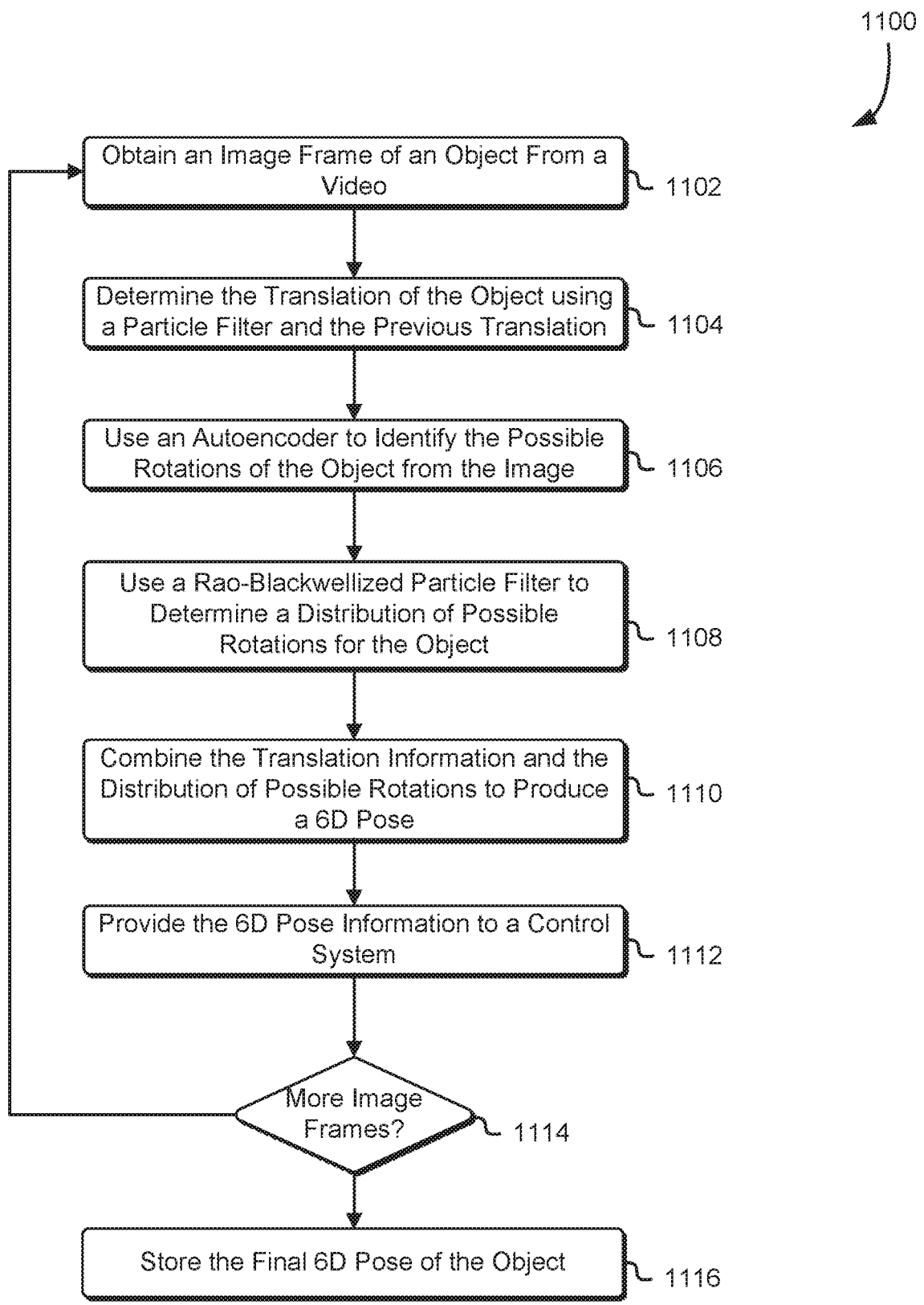
FIG. 11 illustrates an example of a process that, as a result of being performed by the computer system, causes the system to determine the 6D pose of an object from an image, in accordance with an embodiment.

FIG. 11 illustrates an example of a process 1100 that, as a result of being performed by the computer system, cause the system to determine the 6D pose of an object from an image, in accordance with an embodiment. In an embodiment, the process begins at block 1102 with the computer system obtaining a video frame. In an embodiment, a video frame may be obtained from a video obtained by a video camera, or as an individual image obtained from a still camera. In an embodiment, a video is captured by another system or device and provided to the computer system. In an embodiment, at block 1104 the computer system determines the translation of an object represented in the video frame. In an embodiment, the object may be one of several objects present in the video frame and may be occluded partially by other objects. In an embodiment, translation is estimated based on a bounding box. In an embodiment, a particle filter is applied to the image to estimate the three-dimensional position of the object in space.

In an embodiment, at block 1106, the computer system determines an orientation of the object. In an embodiment, the orientation is a three axis rotation. In an embodiment, the orientation is determined as a distribution of possible orientations for the object. In an embodiment, an autoencoder is used by the computer system to identify the orientation of the object by comparing the cropped image (using the bounding box) to a set of stock images of the object in different orientations. In an embodiment, at block 1108, a Rao-Blackwellized particle filter is used to determine the distribution of possible orientations for the object. In an embodiment, at block 1110, the computer system combines the translation information and the rotation information into a 6D pose that represents the three-dimensional translation and rotation of the object as a distribution. In an embodiment, at block 1112, the computer system provides the 6D pose information to a control system such as a robotic control system, autonomous driving system, augmented reality system, or object tracking system. In an embodiment, at decision block 1114, if additional image frames of the video are available, execution returns to block 1102 and the current 6D pose information is used in addition to information in the next image to determine updated translation and rotation for the object. In an embodiment, if no additional images are available in the video, the final 6D pose of the object may be stored or provided to another system for use when additional image frames become available.

Figure 12:
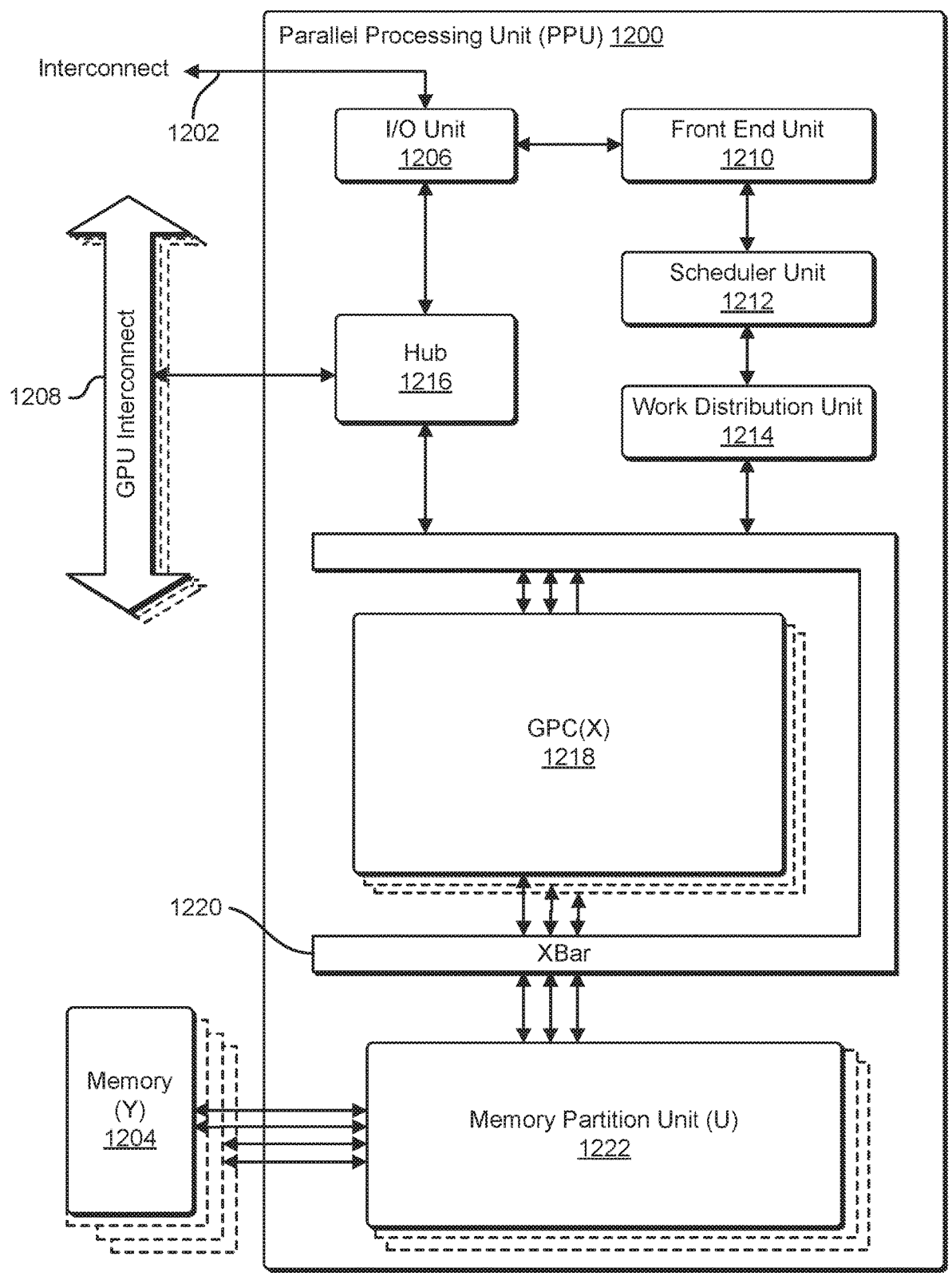
FIG. 12 illustrates an example of a parallel processing unit ("PPU"), in accordance with an embodiment.

FIG. 12 illustrates a parallel processing unit ("PPU") 1200, in accordance with one embodiment. In an embodiment, the PPU 1200 is configured with machine-readable code that, if executed by the PPU, causes the PPU to perform some or all of processes and techniques described throughout this disclosure. In an embodiment, the PPU 1200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 1200. In an embodiment, the PPU 1200 is a graphics processing unit ("GPU") configured to implement a graphics rendering pipeline for processing three-dimensional ("3-D") graphics data in order to generate two-dimensional ("2D") image data for display on a display device such as a liquid crystal display (LCD) device. In an embodiment, the PPU 1200 is utilized to perform computations such as linear algebra operations and machine-learning operations. FIG. 12 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 1200 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 1200 includes an Input/Output ("I/O") unit 1206, a front-end unit 1210, a scheduler unit 1212, a work distribution unit 1214, a hub 1216, a crossbar ("Xbar") 1220, one or more general processing clusters ("GPCs") 1218, and one or more partition units 1222. In an embodiment, the PPU 1200 is connected to a host processor or other PPUs 1200 via one or more high-speed GPU interconnects 1208. In an embodiment, the PPU 1200 is connected to a host processor or other peripheral devices via an interconnect 1202. In an embodiment, the PPU 1200 is connected to a local memory comprising one or more memory devices 1204. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 1208 may refer to a wire-based multi-lane communications link that is used by systems to scale and include one or more PPUs 1200 combined with one or more CPUs, supports cache coherence between the PPUs 1200 and CPUs, and CPU mastering. In an embodiment, data and/or commands are transmitted by the high-speed GPU interconnect 1208 through the hub 1216 to/from other units of the PPU 1200 such as one or more copy engines, video encoders, video decoders, power management units, and other components which may not be explicitly illustrated in FIG. 12.

In an embodiment, the I/O unit 1206 is configured to transmit and receive communications (e.g., commands, data) from a host processor (not illustrated in FIG. 12) over the system bus 1202. In an embodiment, the I/O unit 1206 communicates with the host processor directly via the system bus 1202 or through one or more intermediate devices such as a memory bridge. In an embodiment, the I/O unit 1206 may communicate with one or more other processors, such as one or more of the PPUs 1200 via the system bus 1202. In an embodiment, the I/O unit 1206 implements a Peripheral Component Interconnect Express ("PCIe") interface for communications over a PCIe bus. In an embodiment, the I/O unit 1206 implements interfaces for communicating with external devices.

In an embodiment, the I/O unit 1206 decodes packets received via the system bus 1202. In an embodiment, at least some packets represent commands configured to cause the PPU 1200 to perform various operations. In an embodiment, the I/O unit 1206 transmits the decoded commands to various other units of the PPU 1200 as specified by the commands. In an embodiment, commands are transmitted to the front-end unit 1210 and/or transmitted to the hub 1216 or other units of the PPU 1200 such as one or more copy engines, a video encoder, a video decoder, a power management unit, etc. (not explicitly illustrated in FIG. 12). In an embodiment, the I/O unit 1206 is configured to route communications between and among the various logical units of the PPU 1200.

In an embodiment, a program executed by the host processor encodes a command stream in a buffer that provides workloads to the PPU 1200 for processing. In an embodiment, a workload comprises instructions and data to be processed by those instructions. In an embodiment, the buffer is a region in a memory that is accessible (e.g., read/write) by both the host processor and the PPU 1200—the host interface unit may be configured to access the buffer in a system memory connected to the system bus 1202 via memory requests transmitted over the system bus 1202 by the I/O unit 1206. In an embodiment, the host processor writes the command stream to the buffer and then transmits a pointer to the start of the command stream to the PPU 1200 such that the front-end unit 1210 receives pointers to one or more command streams and manages the one or more streams, reading commands from the streams and forwarding commands to the various units of the PPU 1200.

In an embodiment, the front-end unit 1210 is coupled to a scheduler unit 1212 that configures the various GPCs 1218 to process tasks defined by the one or more streams. In an embodiment, the scheduler unit 1212 is configured to track state information related to the various tasks managed by the scheduler unit 1212 where the state information may indicate which GPC 1218 a task is assigned to, whether the task is active or inactive, a priority level associated with the task, and so forth. In an embodiment, the scheduler unit 1212 manages the execution of a plurality of tasks on the one or more GPCs 1218.

In an embodiment, the scheduler unit 1212 is coupled to a work distribution unit 1214 that is configured to dispatch tasks for execution on the GPCs 1218. In an embodiment, the work distribution unit 1214 tracks a number of scheduled tasks received from the scheduler unit 1212 and the work distribution unit 1214 manages a pending task pool and an active task pool for each of the GPCs 1218. In an embodiment, the pending task pool comprises a number of slots (e.g., 32 slots) that contain tasks assigned to be processed by a particular GPC 1218; the active task pool may comprise a number of slots (e.g., 4 slots) for tasks that are actively being processed by the GPCs 1218 such that as a GPC 1218 completes the execution of a task, that task is evicted from the active task pool for the GPC 1218 and one of the other tasks from the pending task pool is selected and scheduled for execution on the GPC 1218. In an embodiment, if an active task is idle on the GPC 1218, such as while waiting for a data dependency to be resolved, then the active task is evicted from the GPC 1218 and returned to the pending task pool while another task in the pending task pool is selected and scheduled for execution on the GPC 1218.

In an embodiment, the work distribution unit 1214 communicates with the one or more GPCs 1218 via XBar 1220. In an embodiment, the XBar 1220 is an interconnect network that couples many of the units of the PPU 1200 to other units of the PPU 1200 and can be configured to couple the work distribution unit 1214 to a particular GPC 1218. Although not shown explicitly, one or more other units of the PPU 1200 may also be connected to the XBar 1220 via the hub 1216.

The tasks are managed by the scheduler unit 1212 and dispatched to a GPC 1218 by the work distribution unit 1214. The GPC 1218 is configured to process the task and generate results. The results may be consumed by other tasks within the GPC 1218, routed to a different GPC 1218 via the XBar 1220, or stored in the memory 1204. The results can be written to the memory 1204 via the partition units 1222, which implement a memory interface for reading and writing data to/from the memory 1204. The results can be transmitted to another PPU 1204 or CPU via the high-speed GPU interconnect 1208. In an embodiment, the PPU 1200 includes a number U of partition units 1222 that is equal to the number of separate and distinct memory devices 1204 coupled to the PPU 1200. A partition unit 1222 will be described in more detail below in conjunction with FIG. 14.

In an embodiment, a host processor executes a driver kernel that implements an application programming interface ("API") that enables one or more applications executing on the host processor to schedule operations for execution on the PPU 1200. In an embodiment, multiple compute applications are simultaneously executed by the PPU 1200 and the PPU 1200 provides isolation, quality of service ("QoS"), and independent address spaces for the multiple compute applications. In an embodiment, an application generates instructions (e.g., in the form of API calls) that cause the driver kernel to generate one or more tasks for execution by the PPU 1200 and the driver kernel outputs tasks to one or more streams being processed by the PPU 1200. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 14A.

Figure 13:
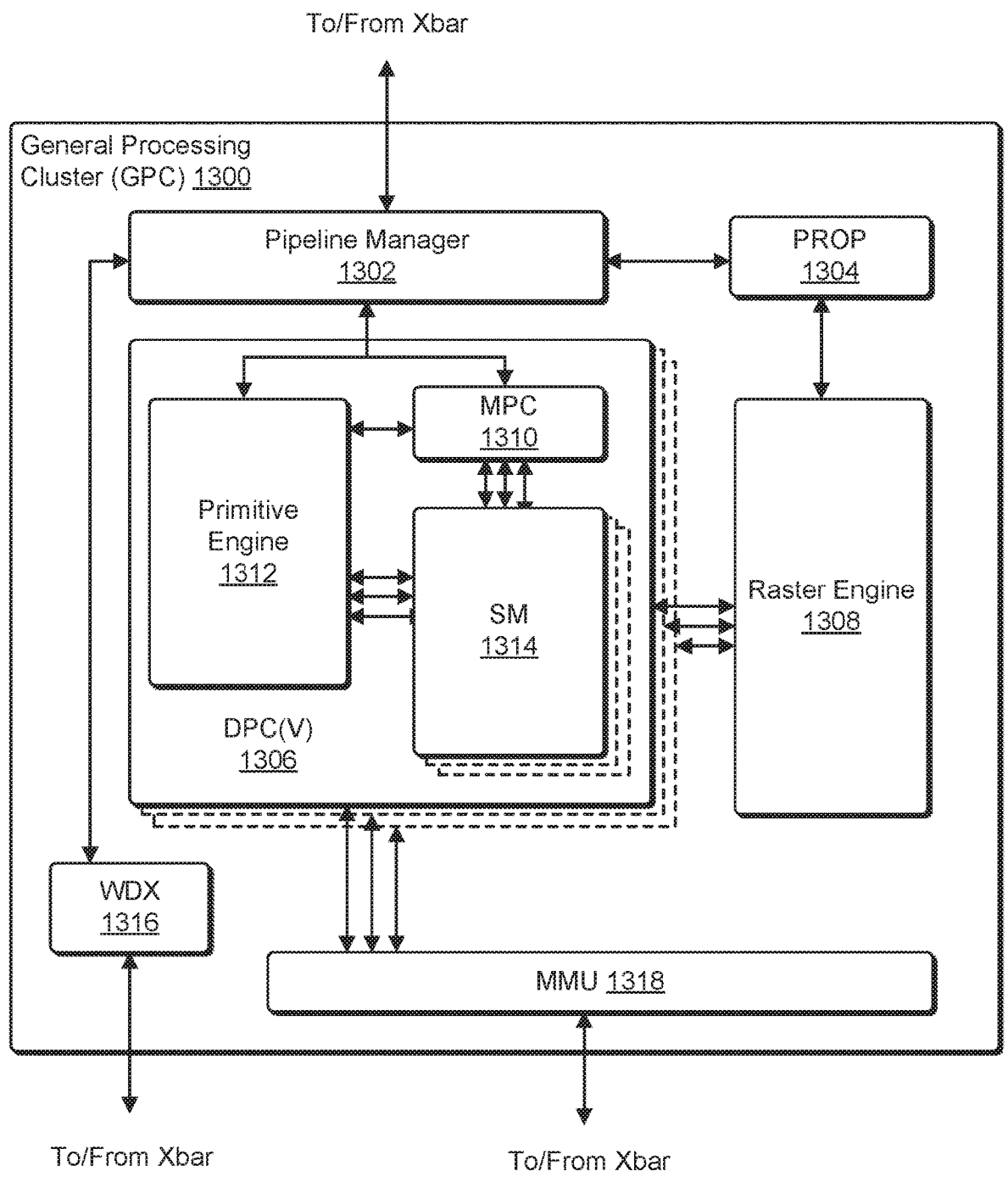
FIG. 13 illustrates an example of a general processing cluster ("GPC"), in accordance with one embodiment.

FIG. 13 illustrates a GPC 1300 such as the GPC illustrated of the PPU 1200 of FIG. 12, in accordance with one embodiment. In an embodiment, each GPC 1300 includes a number of hardware units for processing tasks and each GPC 1300 includes a pipeline manager 1302, a pre-raster operations unit ("PROP") 1304, a raster engine 1308, a work distribution crossbar ("WDX") 1316, a memory management unit ("MMU") 1318, one or more Data Processing Clusters ("DPCs") 1306, and any suitable combination of parts. It will be appreciated that the GPC 1300 of FIG. 13 may include other hardware units in lieu of or in addition to the units shown in FIG. 13.

In an embodiment, the operation of the GPC 1300 is controlled by the pipeline manager 1302. The pipeline manager 1302 manages the configuration of the one or more DPCs 1306 for processing tasks allocated to the GPC 1300. In an embodiment, the pipeline manager 1302 configures at least one of the one or more DPCs 1306 to implement at least a portion of a graphics rendering pipeline. In an embodiment, a DPC 1306 is configured to execute a vertex shader program on the programmable streaming multiprocessor ("SM") 1314. The pipeline manager 1302 is configured to route packets received from a work distribution to the appropriate logical units within the GPC 1300, in an embodiment, and some packets may be routed to fixed function hardware units in the PROP 1304 and/or raster engine 1308 while other packets may be routed to the DPCs 1306 for processing by the primitive engine 1312 or the SM 1314. In an embodiment, the pipeline manager 1302 configures at least one of the one or more DPCs 1306 to implement a neural network model and/or a computing pipeline.

The PROP unit 1304 is configured, in an embodiment, to route data generated by the raster engine 1308 and the DPCs 1306 to a Raster Operations ("ROP") unit in the memory partition unit, described in more detail above. In an embodiment, the PROP unit 1304 is configured to perform optimizations for color blending, organize pixel data, perform address translations, and more. The raster engine 1308 includes a number of fixed function hardware units configured to perform various raster operations, in an embodiment, and the raster engine 1308 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1308 comprises fragments to be processed by any suitable entity such as by a fragment shader implemented within a DPC 1306.

In an embodiment, each DPC 1306 included in the GPC 1300 comprises an M-Pipe Controller ("MPC") 1310; a primitive engine 1312; one or more SMs 1314; and any suitable combination thereof. In an embodiment, the MPC 1310 controls the operation of the DPC 1306, routing packets received from the pipeline manager 1302 to the appropriate units in the DPC 1306. In an embodiment, packets associated with a vertex are routed to the primitive engine 1312, which is configured to fetch vertex attributes associated with the vertex from memory; in contrast, packets associated with a shader program may be transmitted to the SM 1314.

In an embodiment, the SM 1314 comprises a programmable streaming processor that is configured to process tasks represented by a number of threads. In an embodiment, the SM 1314 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1314 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1314 is described in more detail below.

In an embodiment, the MMU 1318 provides an interface between the GPC 1300 and the memory partition unit and the MMU 1318 provides translation of virtual addresses into physical addresses, memory protection, and arbitration of memory requests. In an embodiment, the MMU 1318 provides one or more translation lookaside buffers ("TLBs") for performing translation of virtual addresses into physical addresses in memory.

Figure 14:
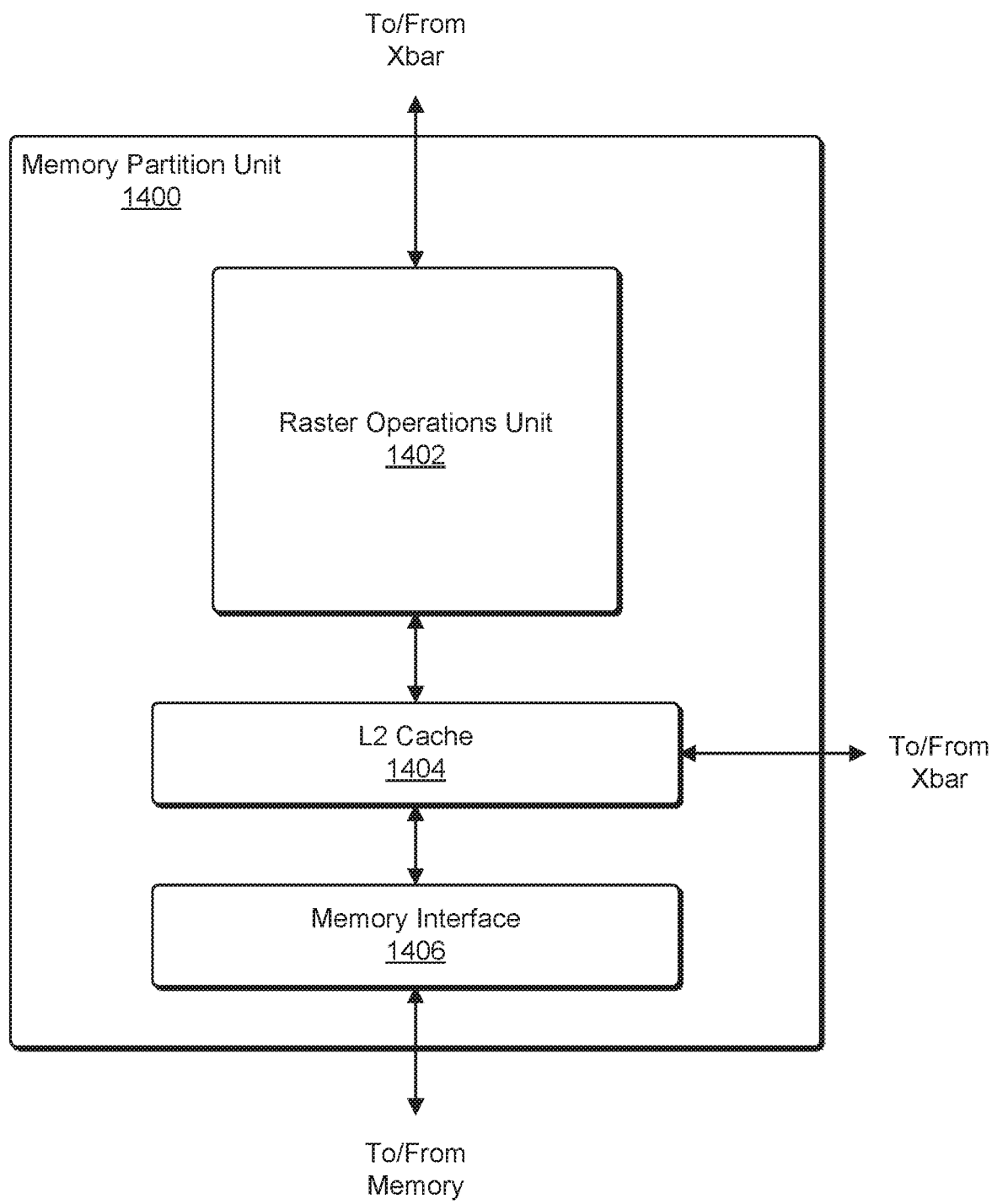
FIG. 14 illustrates an example of a memory partition unit, in accordance with one embodiment.

FIG. 14 illustrates a memory partition unit of a PPU, in accordance with one embodiment. In an embodiment, the memory partition unit 1400 includes a Raster Operations ("ROP") unit 1402; a level two ("L2") cache 1404; a memory interface 1406; and any suitable combination thereof. The memory interface 1406 is coupled to the memory. Memory interface 1406 may implement 32, 64, 128, 1024-bit data buses, or the like, for high-speed data transfer. In an embodiment, the PPU incorporates U memory interfaces 1406, one memory interface 1406 per pair of partition units 1400, where each pair of partition units 1400 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 1406 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 1400 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 1208 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 1400 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 12 or other system memory is fetched by the memory partition unit 1400 and stored in the L2 cache 1404, which is located on-chip and is shared between the various GPCs, in accordance with one embodiment. Each memory partition unit 1400, in an embodiment, includes at least a portion of the L2 cache 1360 associated with a corresponding memory device. In an embodiment, lower level caches are implemented in various units within the GPCs. In an embodiment, each of the SMs 1440 may implement a level one ("L1") cache wherein the L1 cache is private memory that is dedicated to a particular SM 1440 and data from the L2 cache 1404 is fetched and stored in each of the L1 caches for processing in the functional units of the SMs 1440. In an embodiment, the L2 cache 1404 is coupled to the memory interface 1406 and the XBar 1220.

The ROP unit 1402 performs graphics raster operations related to pixel color, such as color compression, pixel blending, and more, in an embodiment. The ROP unit 1402, in an embodiment, implements depth testing in conjunction with the raster engine 1425, receiving a depth for a sample location associated with a pixel fragment from the culling engine of the raster engine 1425. In an embodiment, the depth is tested against a corresponding depth in a depth buffer for a sample location associated with the fragment. In an embodiment, if the fragment passes the depth test for the sample location, then the ROP unit 1402 updates the depth buffer and transmits a result of the depth test to the raster engine 1425. It will be appreciated that the number of partition units 1400 may be different than the number of GPCs and, therefore, each ROP unit 1402 can, in an embodiment, be coupled to each of the GPCs. In an embodiment, the ROP unit 1402 tracks packets received from the different GPCs and determines which that a result generated by the ROP unit 1402 is routed to through the Xbar.

Figure 15:
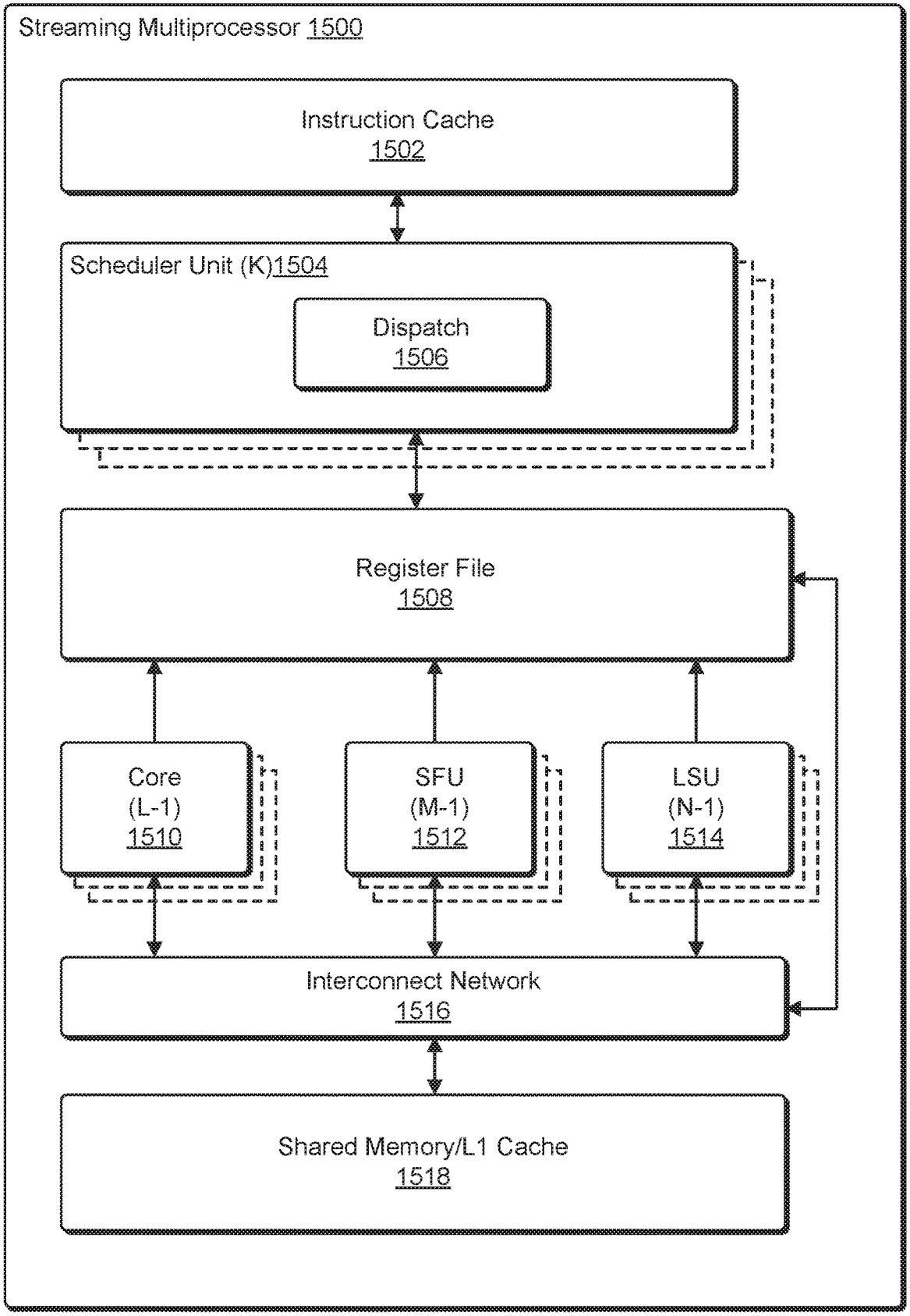
FIG. 15 illustrates an example of a streaming multi-processor, in accordance with one embodiment.

FIG. 15 illustrates a streaming multi-processor such as the streaming multi-processor of FIG. 13, in accordance with one embodiment. In an embodiment, the SM 1500 includes: an instruction cache 1502; one or more scheduler units 1504; a register file 1508; one or more processing cores 1510; one or more special function units ("SFUs") 1512; one or more load/store units ("LSUs") 1514; an interconnect network 1516; a shared memory/L1 cache 1518; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1500. In an embodiment, the scheduler unit 1504 receives the tasks from the work distribution unit and manages instruction scheduling for one or more thread blocks assigned to the SM 1500. In an embodiment, the scheduler unit 1504 schedules thread blocks for execution as warps of parallel threads, wherein each thread block is allocated at least one warp. In an embodiment, each warp executes threads. In an embodiment, the scheduler unit 1504 manages a plurality of different thread blocks, allocating the warps to the different thread blocks and then dispatching instructions from the plurality of different cooperative groups to the various functional units (e.g., cores 1510, SFUs 1512, and LSUs 1514) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1506 is configured to transmit instructions to one or more of the functional units and the scheduler unit 1504 includes two dispatch units 1506 that enable two different instructions from the same warp to be dispatched during each clock cycle. In an embodiment, each scheduler unit 1504 includes a single dispatch unit 1506 or additional dispatch units 1506.

Each SM 1500, in an embodiment, includes a register file 1508 that provides a set of registers for the functional units of the SM 1500. In an embodiment, the register file 1508 is divided between each of the functional units such that each functional unit is allocated a dedicated portion of the register file 1508. In an embodiment, the register file 1508 is divided between the different warps being executed by the SM 1500 and the register file 1508 provides temporary storage for operands connected to the data paths of the functional units. In an embodiment, each SM 1500 comprises a plurality of L processing cores 1510. In an embodiment, the SM 1500 includes a large number (e.g., 128 or more) of distinct processing cores 1510. Each core 1510, in an embodiment, includes a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1510 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1510. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1500 comprises M SFUs 1512 that perform special functions (e.g., attribute evaluation, reciprocal square root, and the like). In an embodiment, the SFUs 1512 include a tree traversal unit configured to traverse a hierarchical tree data structure. In an embodiment, the SFUs 1512 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1500. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1500 includes two texture units.

Each SM 1500 comprises N LSUs 1454 that implement load and store operations between the shared memory/L1 cache 1406 and the register file 1508, in an embodiment. Each SM 1500 includes an interconnect network 1516 that connects each of the functional units to the register file 1508 and the LSU 1514 to the register file 1508, shared memory/L1 cache 1518 in an embodiment. In an embodiment, the interconnect network 1516 is a crossbar that can be configured to connect any of the functional units to any of the registers in the register file 1508 and connect the LSUs 1514 to the register file and memory locations in shared memory/L cache 1518.

The shared memory/L1 cache 1518 is an array of on-chip memory that allows for data storage and communication between the SM 1500 and the primitive engine and between threads in the SM 1500 in an embodiment. In an embodiment, the shared memory/L1 cache 1518 comprises 128 KB of storage capacity and is in the path from the SM 1500 to the partition unit. The shared memory/L1 cache 1518, in an embodiment, is used to cache reads and writes. One or more of the shared memory/L1 cache 1518, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1518 enables the shared memory/L1 cache 1518 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1500 to execute the program and perform calculations, shared memory/L1 cache 1518 to communicate between threads, and the LSU 1514 to read and write global memory through the shared memory/L1 cache 1518 and the memory partition unit, in accordance with one embodiment. In an embodiment, when configured for general purpose parallel computation, the SM 1500 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 16:
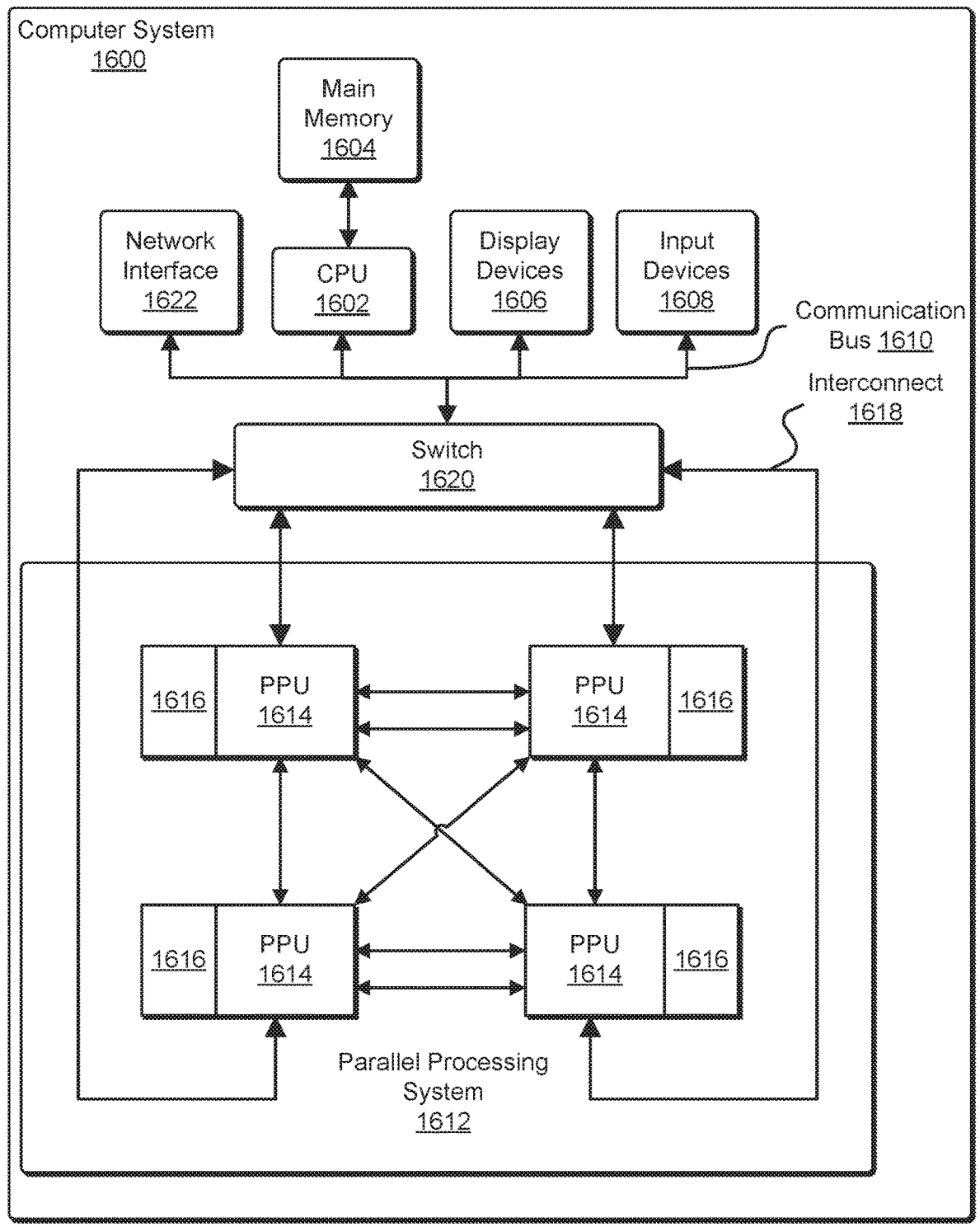
FIG. 16 illustrates a computer system in which the various examples can be implemented, in accordance with one embodiment.

FIG. 16 illustrates a computer system 1600 in which the various architecture and/or functionality can be implemented, in accordance with one embodiment. The computer system 1600, in an embodiment, is configured to implement various processes and methods described throughout this disclosure.

In an embodiment, the computer system 1600 comprises at least one central processing unit 1602 that is connected to a communication bus 1610 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1600 includes a main memory 1604 and control logic (e.g., implemented as hardware, software, or a combination thereof) and data are stored in the main memory 1604 which may take the form of random access memory ("RAM"). In an embodiment, a network interface subsystem 1622 provides an interface to other computing devices and networks for receiving data from and transmitting data to other systems from the computer system 1600.

The computer system 1600, in an embodiment, includes input devices 1608, the parallel processing system 1612, and display devices 1606 which can be implemented using a conventional CRT (cathode ray tube), LCD (liquid crystal display), LED (light emitting diode), plasma display, or other suitable display technologies. In an embodiment, user input is received from input devices 1608 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1604 and/or secondary storage. Computer programs, if executed by one or more processors, enable the system 1600 to perform various functions in accordance with one embodiment. The memory 1604, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1602; parallel processing system 1612; an integrated circuit capable of at least a portion of the capabilities of both the central processor 1602; the parallel processing system 1612; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1600 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1612 includes a plurality of PPUs 1614 and associated memories 1616. In an embodiment, the PPUs are connected to a host processor or other peripheral devices via an interconnect 1618 and a switch 1620 or multiplexer. In an embodiment, the parallel processing system 1612 distributes computational tasks across the PPUs 1614 which can be parallelizable—for example, as part of the distribution of computational tasks across multiple GPU thread blocks. In an embodiment, memory is shared and accessible (e.g., for read and/or write access) across some or all of the PPUs 1614, although such shared memory may incur performance penalties relative to the use of local memory and registers resident to a PPU. In an embodiment, the operation of the PPUs 1614 is synchronized through the use of a command such as _syncthreads( ) which requires all threads in a block (e.g., executed across multiple PPUs 1614) to reach a certain point of execution of code before proceeding.

Figure 17A:
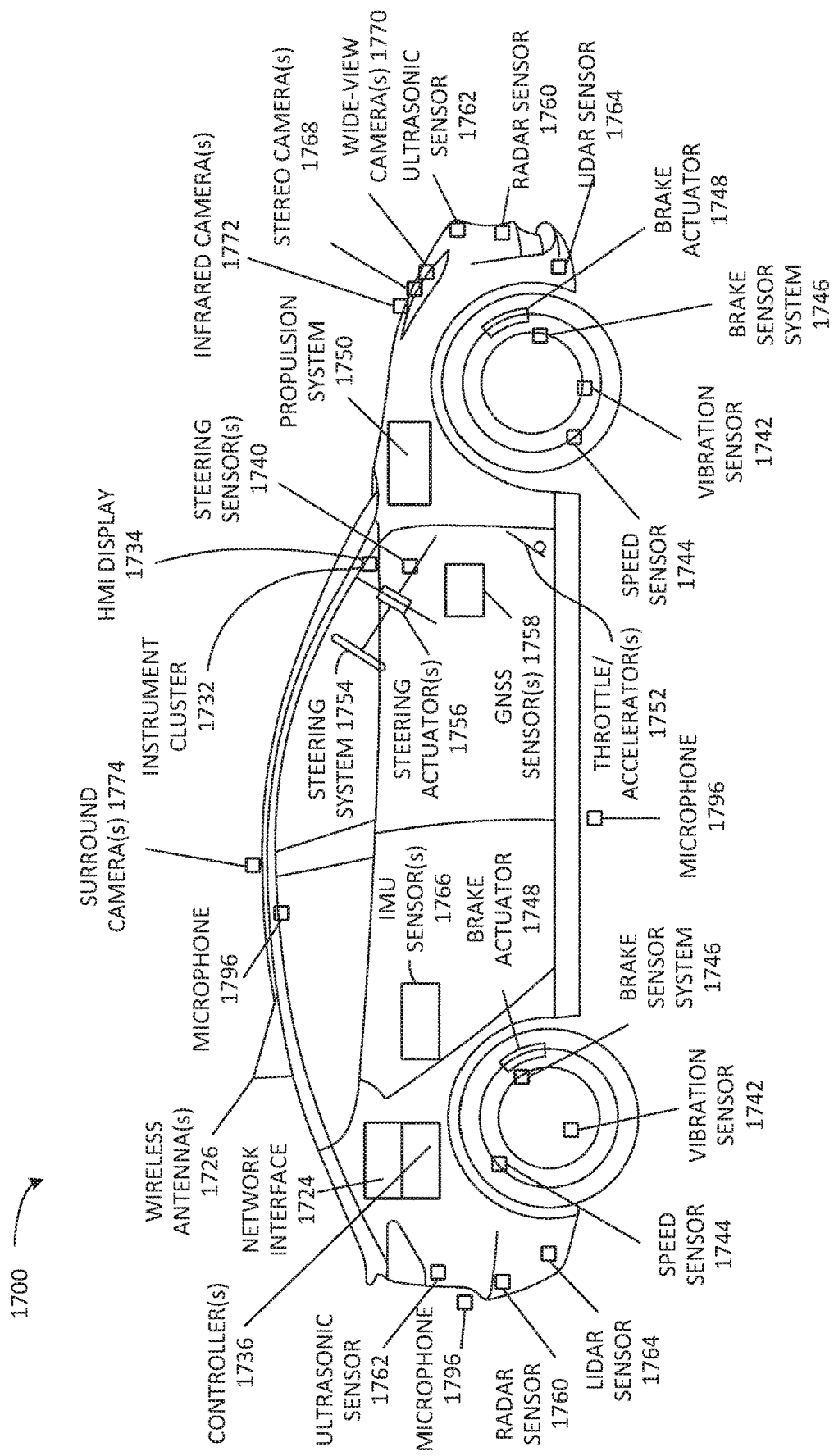
FIG. 17A illustrates an example of an autonomous vehicle, according to at least one embodiment.

FIG. 17A illustrates an example of an autonomous vehicle 1700, according to at least one embodiment. In at least one embodiment, autonomous vehicle 1700 (alternatively referred to herein as "vehicle 1700") may be, without limitation, a passenger vehicle, such as a car, a truck, a bus, and/or another type of vehicle that accommodates one or more passengers. In at least one embodiment, vehicle 1700 may be a semi-tractor-trailer truck used for hauling cargo. In at least one embodiment, vehicle 1700 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1700 may be capable of functionality in accordance with one or more of level 1-level 5 of autonomous driving levels. For example, in at least one embodiment, vehicle 1700 may be capable of conditional automation (Level 3), high automation (Level 4), and/or full automation (Level 5), depending on embodiment.

In at least one embodiment, vehicle 1700 may include, without limitation, components such as a chassis, a vehicle body, wheels (e.g., 2, 4, 6, 8, 18, etc.), tires, axles, and other components of a vehicle. In at least one embodiment, vehicle 1700 may include, without limitation, a propulsion system 1750, such as an internal combustion engine, hybrid electric power plant, an all-electric engine, and/or another propulsion system type. In at least one embodiment, propulsion system 1750 may be connected to a drive train of vehicle 1700, which may include, without limitation, a transmission, to enable propulsion of vehicle 1700. In at least one embodiment, propulsion system 1750 may be controlled in response to receiving signals from a throttle/accelerator(s) 1752.

In at least one embodiment, a steering system 1754, which may include, without limitation, a steering wheel, is used to steer a vehicle 1700 (e.g., along a desired path or route) when a propulsion system 1750 is operating (e.g., when a vehicle is in motion). In at least one embodiment, a steering system 1754 may receive signals from steering actuator(s) 1756. A steering wheel may be optional for full automation (Level 5) functionality. n at least one embodiment, a brake sensor system 1746 may be used to operate vehicle brakes in response to receiving signals from brake actuator(s) 1748 and/or brake sensors.

In at least one embodiment, controller(s) 1736, which may include, without limitation, one or more system on chips ("SoCs") (not shown in FIG. 17A) and/or graphics processing unit(s) ("GPU(s)"), provide signals (e.g., representative of commands) to one or more components and/or systems of vehicle 1700. For instance, in at least one embodiment, controller(s) 1736 may send signals to operate vehicle brakes via brake actuators 1748, to operate steering system 1754 via steering actuator(s) 1756, to operate propulsion system 1750 via throttle/accelerator(s) 1752. Controller(s) 1736 may include one or more onboard (e.g., integrated) computing devices (e.g., supercomputers) that process sensor signals, and output operation commands (e.g., signals representing commands) to enable autonomous driving and/or to assist a human driver in driving vehicle 1700. In at least one embodiment, controller(s) 1736 may include a first controller 1736 for autonomous driving functions, a second controller 1736 for functional safety functions, a third controller 1736 for artificial intelligence functionality (e.g., computer vision), a fourth controller 1736 for infotainment functionality, a fifth controller 1736 for redundancy in emergency conditions, and/or other controllers. In at least one embodiment, a single controller 1736 may handle two or more of above functionalities, two or more controllers 1736 may handle a single functionality, and/or any combination thereof.

In at least one embodiment, controller(s) 1736 provide signals for controlling one or more components and/or systems of vehicle 1700 in response to sensor data received from one or more sensors (e.g., sensor inputs). In at least one embodiment, sensor data may be received from, for example and without limitation, global navigation satellite systems ("GNSS") sensor(s) 1758 (e.g., Global Positioning System sensor(s)), RADAR sensor(s) 1760, ultrasonic sensor(s) 1762, LIDAR sensor(s) 1764, inertial measurement unit ("IMU") sensor(s) 1766 (e.g., accelerometer(s), gyroscope(s), magnetic compass(es), magnetometer(s), etc.), microphone(s) 1796, stereo camera(s) 1768, wide-view camera(s) 1770 (e.g., fisheye cameras), infrared camera(s) 1772, surround camera(s) 1774 (e.g., 360 degree cameras), long-range cameras (not shown in FIG. 17A), mid-range camera(s) (not shown in FIG. 17A), speed sensor(s) 1744 (e.g., for measuring speed of vehicle 1700), vibration sensor(s) 1742, steering sensor(s) 1740, brake sensor(s) (e.g., as part of brake sensor system 1746), and/or other sensor types.

In at least one embodiment, one or more of controller(s) 1736 may receive inputs (e.g., represented by input data) from an instrument cluster 1732 of vehicle 1700 and provide outputs (e.g., represented by output data, display data, etc.) via a human-machine interface ("HMI") display 1734, an audible annunciator, a loudspeaker, and/or via other components of vehicle 1700. In at least one embodiment, outputs may include information such as vehicle velocity, speed, time, map data (e.g., a High Definition map (not shown in FIG. 17A), location data (e.g., vehicle's 1700 location, such as on a map), direction, location of other vehicles (e.g., an occupancy grid), information about objects and status of objects as perceived by controller(s) 1736, etc. For example, in at least one embodiment, HMI display 1734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1700 further includes a network interface 1724 which may use wireless antenna(s) 1726 and/or modem(s) to communicate over one or more networks. For example, in at least one embodiment, network interface 1724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 115 are used to perform inferencing and/or training operations associated with one or more embodiments. In at least one embodiment, inference and/or training logic 115 may be used in system FIG. 17A for inferencing or predicting operations based, at least in part, on weight parameters calculated using neural network training operations, neural network functions and/or architectures, or neural network use cases described herein.

In at least one embodiment, inference and/or training logic 115 may include, without limitation, a data storage to store forward and/or output weight and/or input/output data corresponding to neurons or layers of a neural network trained and/or used for inferencing in aspects of one or more embodiments. In at least one embodiment data storage stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage may be included with other on-chip or off-chip data storage, including a processor's L1, L2, or L3 cache or system memory.

In at least one embodiment, any portion of data storage may be internal or external to one or more processors or other hardware logic devices or circuits. In at least one embodiment, data storage may be cache memory, dynamic randomly addressable memory ("DRAM"), static randomly addressable memory ("SRAM"), non-volatile memory (e.g., Flash memory), or other storage. In at least one embodiment, choice of whether data storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic may include, without limitation, a data storage to store backward and/or output weight and/or input/output data corresponding to neurons or layers of a neural network trained and/or used for inferencing in aspects of one or more embodiments. In at least one embodiment, data storage stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage may be included with other on-chip or off-chip data storage, including a processor's L1, L2, or L3 cache or system memory. In at least one embodiment, any portion of data storage may be internal or external to on one or more processors or other hardware logic devices or circuits. In at least one embodiment, data storage may be cache memory, DRAM, SRAM, non-volatile memory (e.g., Flash memory), or other storage. In at least one embodiment, choice of whether data storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage and data storage may be separate storage structures. In at least one embodiment, data storage and data storage may be same storage structure. In at least one embodiment, data storage and data storage may be partially same storage structure and partially separate storage structures. In at least one embodiment, any portion of data storage and data storage may be included with other on-chip or off-chip data storage, including a processor's L1, L2, or L3 cache or system memory.

In at least one embodiment, inference and/or training logic may include, without limitation, one or more arithmetic logic unit(s) ("ALU(s)") to perform logical and/or mathematical operations based, at least in part on, or indicated by, training and/or inference code, result of which may result in activations (e.g., output values from layers or neurons within a neural network) stored in an activation storage that are functions of input/output and/or weight parameter data stored in data storage and/or data storage. In at least one embodiment, activations stored in activation storage are generated according to linear algebraic and or matrix-based mathematics performed by ALU(s) in response to performing instructions or other code, wherein weight values stored in data storage and/or data are used as operands along with other values, such as bias values, gradient information, momentum values, or other parameters or hyperparameters, any or all of which may be stored in data storage or data storage or another storage on or off-chip. In at least one embodiment, ALU(s) are included within one or more processors or other hardware logic devices or circuits, whereas in another embodiment, ALU(s) may be external to a processor or other hardware logic device or circuit that uses them (e.g., a co-processor). In at least one embodiment, ALUs may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage, data storage, and activation storage may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage may be cache memory, DRAM, SRAM, non-volatile memory (e.g., Flash memory), or other storage. In at least one embodiment, activation storage may be completely or partially within or external to one or more processors or other logical circuits. In at least one embodiment, choice of whether activation storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit ("CPU")

hardware, graphics processing unit ("GPU") hardware or other hardware, such as field programmable gate arrays ("FPGAs").

In at least one embodiment, inference and/or training logic 115 may include, without limitation, hardware logic in which computational resources are dedicated or otherwise exclusively used in conjunction with weight values or other information corresponding to one or more layers of neurons within a neural network. In at least one embodiment, inference and/or training logic 115 may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit (CPU) hardware, graphics processing unit (GPU) hardware or other hardware, such as field programmable gate arrays (FPGAs). In at least one embodiment, inference and/or training logic 115 includes, without limitation, data storage and data storage, which may be used to store weight values and/or other information, including bias values, gradient information, momentum values, and/or other parameter or hyperparameter information. In at least one embodiment, each of data storage and data storage is associated with a dedicated computational resource, such as computational hardware and computational hardware, respectively. In at least one embodiment, each of computational hardware and computational hardware comprises one or more ALUs that perform mathematical functions, such as linear algebraic functions, only on information stored in data storage and data storage, respectively, result of which is stored in activation storage.

In at least one embodiment, each data storage and corresponding computational hardware, respectively, correspond to different layers of a neural network, such that resulting activation from one "storage/computational pair" of data storage and computational hardware is provided as an input to next "storage/computational pair" of data storage and computational hardware, in order to mirror conceptual organization of a neural network. In at least one embodiment, each of storage/computational pairs may correspond to more than one neural network layer. In at least one embodiment, additional storage/computation pairs (not shown) subsequent to or in parallel with storage computation pairs may be included in inference and/or training logic.

Neural Network Training and Deployment

In at least one embodiment, untrained neural network is trained using a training dataset. In at least one embodiment, training framework is a PyTorch framework, whereas in other embodiments, training framework is a Tensorflow, Boost, Caffe, Microsoft Cognitive Toolkit/CNTK, MXNet, Chainer, Keras, Deeplearning4j, or other training framework. In at least one embodiment training framework trains an untrained neural network and enables it to be trained using processing resources described herein to generate a trained neural network. In at least one embodiment, weights may be chosen randomly or by pre-training using a deep belief network. In at least one embodiment, training may be performed in either a supervised, partially supervised, or unsupervised manner.

In at least one embodiment, untrained neural network is trained using supervised learning, wherein training dataset includes an input paired with a desired output for an input, or where training dataset includes input having known output and the output of the neural network is manually graded. In at least one embodiment, untrained neural network is trained in a supervised manner processes inputs from training dataset and compares resulting outputs against a set of expected or desired outputs. In at least one embodiment, errors are then propagated back through untrained neural network. In at least one embodiment, training framework adjusts weights that control untrained neural network. In at least one embodiment, training framework includes tools to monitor how well untrained neural network is converging towards a model, such as trained neural network, suitable to generating correct answers, such as in result, based on known input data, such as new data. In at least one embodiment, training framework trains untrained neural network repeatedly while adjust weights to refine an output of untrained neural network using a loss function and adjustment algorithm, such as stochastic gradient descent. In at least one embodiment, training framework trains untrained neural network until untrained neural network achieves a desired accuracy. In at least one embodiment, trained neural network can then be deployed to implement any number of machine learning operations.

In at least one embodiment, untrained neural network is trained using unsupervised learning, wherein untrained neural network attempts to train itself using unlabeled data. In at least one embodiment, unsupervised learning training dataset will include input data without any associated output data or "ground truth" data. In at least one embodiment, untrained neural network can learn groupings within training dataset and can determine how individual inputs are related to untrained dataset. In at least one embodiment, unsupervised training can be used to generate a self-organizing map, which is a type of trained neural network capable of performing operations useful in reducing dimensionality of new data. In at least one embodiment, unsupervised training can also be used to perform anomaly detection, which allows identification of data points in a new dataset that deviate from normal patterns of new dataset.

In at least one embodiment, semi-supervised learning may be used, which is a technique in which in training dataset includes a mix of labeled and unlabeled data. In at least one embodiment, training framework may be used to perform incremental learning, such as through transferred learning techniques. In at least one embodiment, incremental learning enables trained neural network to adapt to new data without forgetting knowledge instilled within network during initial training.

In an embodiment, the pose-estimation techniques described herein are applied to an autonomous vehicle such as the vehicle illustrated in FIG. 17A. In an embodiment, the vehicle is controlled by a control system such as that illustrated in FIG. 17C which includes executable instructions that cause the system to estimate the pose of objects around the vehicle using images obtained from one or more cameras. In an embodiment, the cameras may be still or video cameras such as the camera illustrated and described in FIG. 17B.

Figure 17B:
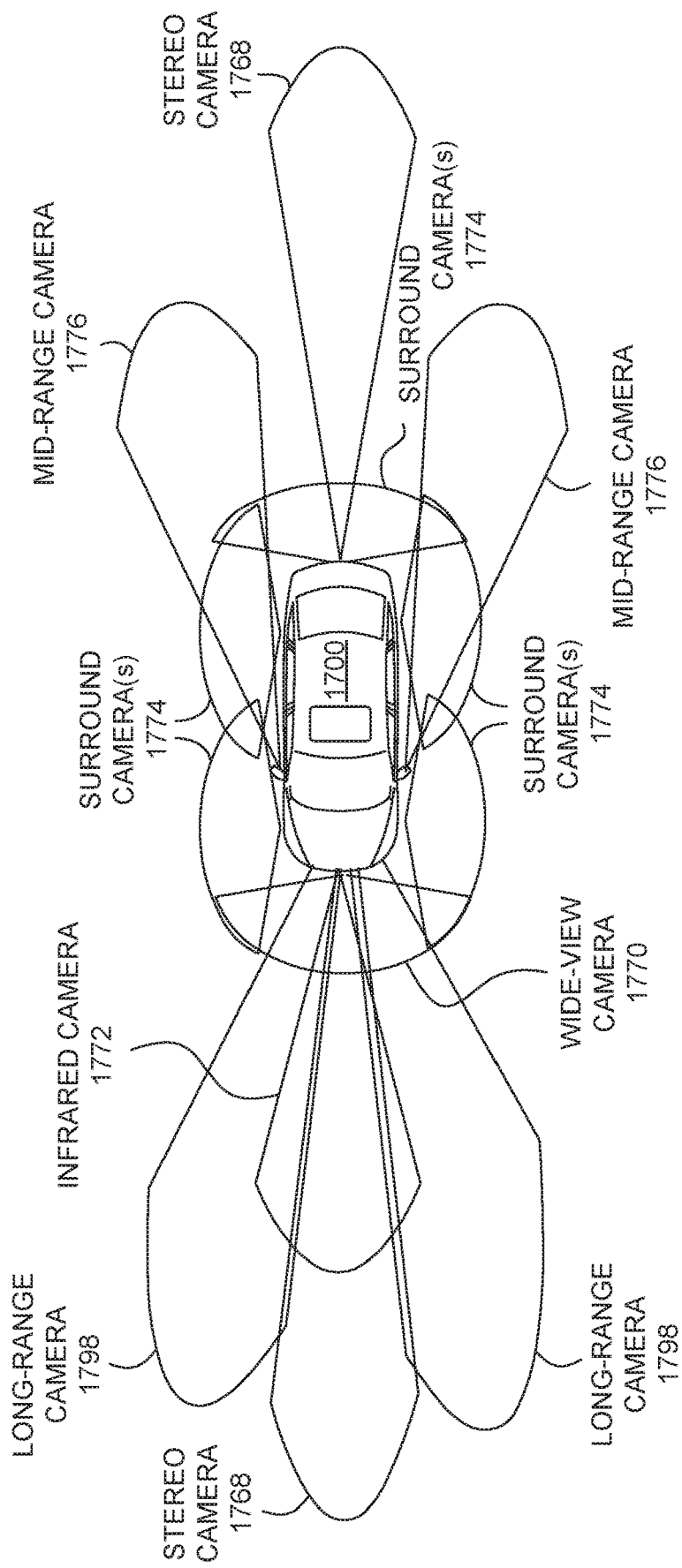
FIG. 17B illustrates an example of camera locations and fields of view for the autonomous vehicle of FIG. 17A, according to at least one embodiment.

FIG. 17B illustrates an example of camera locations and fields of view for autonomous vehicle 1700 of FIG. 17A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1700.

In at least one embodiment, camera types for cameras may include, but are not limited to, digital cameras that may be adapted for use with components and/or systems of vehicle 1700. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in amounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab in at least one embodiment.

In at least one embodiment, cameras with afield of view that include portions of environment in front of vehicle 1700 (e.g., front-facing cameras) may be used for surround view, to help identify forward facing paths and obstacles, as well as aid in, with help of one or more of controllers 1736 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1770 may be used to perceive objects coming into view from periphery (e.g., pedestrians, crossing traffic or bicycles). Although only one wide-view camera 1770 is illustrated in FIG. 17B, in other embodiments, there may be any number (including zero) of wide-view camera(s) 1770 on vehicle 1700. In at least one embodiment, any number of long-range camera(s) 1798 (e.g., a long-view stereo camera pair) may be used for depth-based object detection, especially for objects for which a neural network has not yet been trained. In at least one embodiment, long-range camera(s) 1798 may also be used for object detection and classification, as well as basic object tracking.

In at least one embodiment, any number of stereo camera(s) 1768 may also be included in a front-facing configuration. In at least one embodiment, one or more of stereo camera(s) 1768 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1700, including a distance estimate for all points in image. In at least one embodiment, one or more of stereo camera(s) 1768 may include, without limitation, compact stereo vision sensor(s) that may include, without limitation, two camera lenses (one each on left and right) and an image processing chip that may measure distance from vehicle 1700 to target object and use generated information (e.g., metadata) to activate autonomous emergency braking and lane departure warning functions. In at least one embodiment, other types of stereo camera(s) 1768 may be used in addition to, or alternatively from, those described herein.

In at least one embodiment, cameras with afield of view that include portions of environment to side of vehicle 1700 (e.g., side-view cameras) may be used for surround view, providing information used to create and update occupancy grid, as well as to generate side impact collision warnings. For example, in at least one embodiment, surround camera(s) 1774 (e.g., four surround cameras 1774 as illustrated in FIG. 17B) could be positioned on vehicle 1700. Surround camera(s) 1774 may include, without limitation, any number and combination of wide-view camera(s) 1770, fisheye camera(s), 360 degree camera(s), and/or like. For instance, in at least one embodiment, four fisheye cameras may be positioned on front, rear, and sides of vehicle 1700. In at least one embodiment, vehicle 1700 may use three surround camera(s) 1774 (e.g., left, right, and rear), and may leverage one or more other camera(s) (e.g., a forward-facing camera) as a fourth surround-view camera.

In at least one embodiment, cameras with afield of view that include portions of environment to rear of vehicle 1700 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1798 and/or mid-range camera(s) 1776, stereo camera(s) 1768), infrared camera(s) 1772, etc.), as described herein.

Inference and/or training logic 115 are used to perform inferencing and/or training operations associated with one or more embodiments. In at least one embodiment, inference and/or training logic 115 may be used in system FIG. 17B for inferencing or predicting operations based, at least in part, on weight parameters calculated using neural network training operations, neural network functions and/or architectures, or neural network use cases described herein.

In an embodiment, images or frames of video from the cameras described above may be used to estimate the 6D pose of various objects as described above. In an embodiment, successive images for tracking an object may be obtained from a plurality of cameras. In an embodiment, the objects tracked by the system may be pedestrians, other vehicles, bicycles, personal mobility devices, or scooters. In an embodiment, the system uses the pose information to estimate the direction of motion of the object.

Figure 17C:
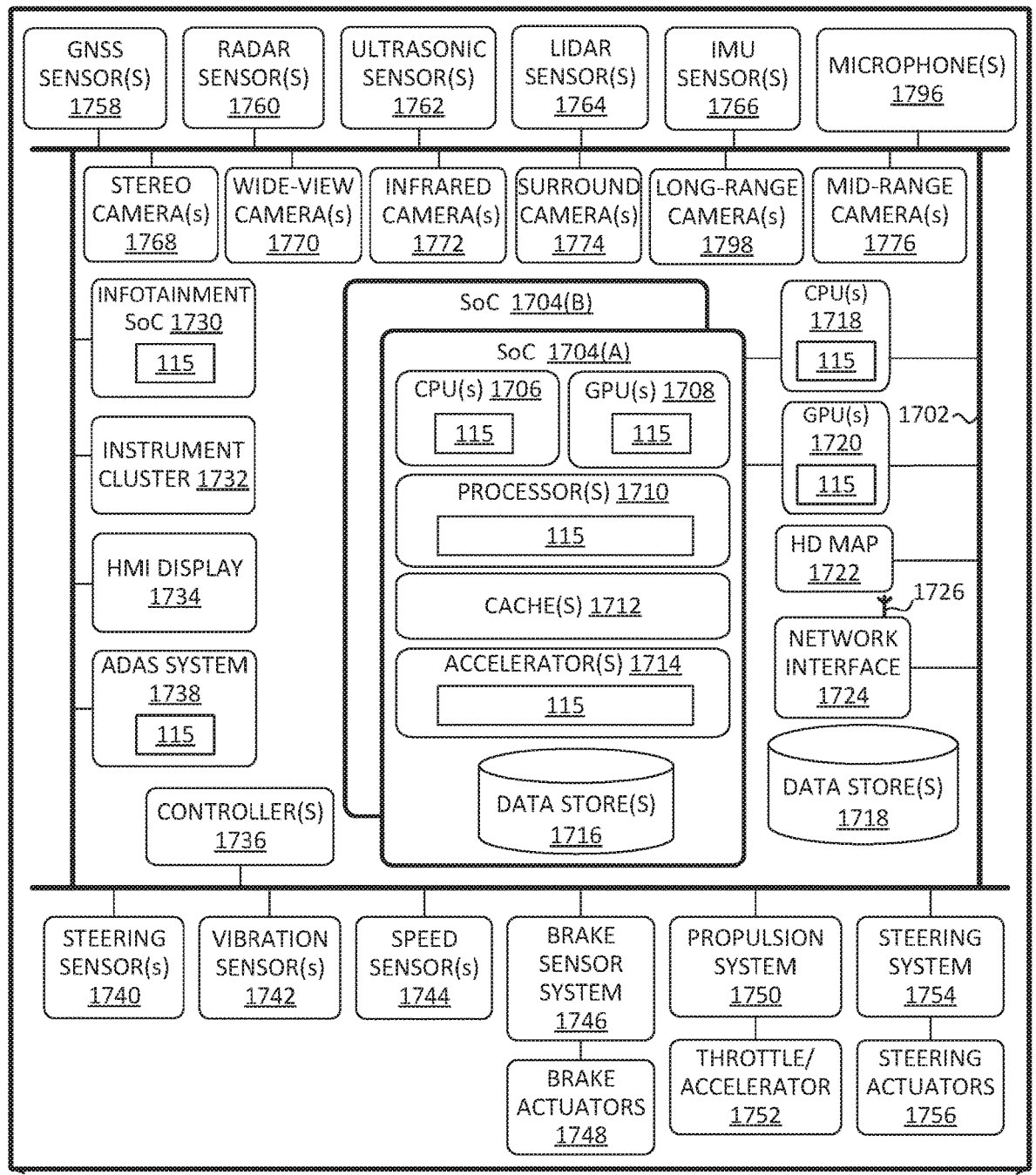
FIG. 17C is a block diagram illustrating an example system architecture for the autonomous vehicle of FIG. 17A, according to at least one embodiment.
Figure 17C:
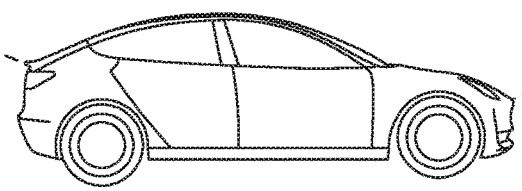

FIG. 17C is a block diagram illustrating an example system architecture for autonomous vehicle 1700 of FIG. 17A, according to at least one embodiment. In at least one embodiment, each of components, features, and systems of vehicle 1700 in FIG. 17C are illustrated as being connected via a bus 1702. In at least one embodiment, bus 1702 may include, without limitation, a CAN data interface (alternatively referred to herein as a "CAN bus"). In at least one embodiment, a CAN may be a network inside vehicle 1700 used to aid in control of various features and functionality of vehicle 1700, such as actuation of brakes, acceleration, braking, steering, windshield wipers, etc. In at least one embodiment, bus 1702 may be configured to have dozens or even hundreds of nodes, each with its own unique identifier (e.g., a CAN ID). In at least one embodiment, bus 1702 may be read to find steering wheel angle, ground speed, engine revolutions per minute ("RPMs"), button positions, and/or other vehicle status indicators. In at least one embodiment, bus 1702 may be a CAN bus that is ASIL B compliant.

In at least one embodiment, in addition to, or alternatively from CAN, FlexRay and/or Ethernet may be used. In at least one embodiment, there may be any number of busses 1702, which may include, without limitation, zero or more CAN busses, zero or more FlexRay busses, zero or more Ethernet busses, and/or zero or more other types of busses using a different protocol. In at least one embodiment, two or more busses 1702 may be used to perform different functions, and/or may be used for redundancy. For example, a first bus 1702 may be used for collision avoidance functionality and a second bus 1702 may be used for actuation control. In at least one embodiment, each bus 1702 may communicate with any of components of vehicle 1700, and two or more busses 1702 may communicate with same components. In at least one embodiment, each of any number of system(s) on chip(s) ("SoC(s)") 1704, each of controller(s) 1736, and/or each computer within vehicle may have access to same input data (e.g., inputs from sensors of vehicle 1700), and may be connected to a common bus, such CAN bus.

In at least one embodiment, vehicle 1700 may include one or more controller(s) 1736, such as those described herein with respect to FIG. 17A. controller(s) 1736 may be used for a variety of functions. In at least one embodiment, controller(s) 1736 may be coupled to any of various other components and systems of vehicle 1700, and may be used for control of vehicle 1700, artificial intelligence of vehicle 1700, infotainment for vehicle 1700, and/or like.

In at least one embodiment, vehicle 1700 may include any number of SoCs 1704. Each of SoCs 1704 may include, without limitation, central processing units ("CPU(s)") 1706, graphics processing units ("GPU(s)") 1708, processor(s) 1710, cache(s) 1712, accelerator(s) 1714, data store(s) 1716, and/or other components and features not illustrated. In at least one embodiment, SoC(s) 1704 may be used to control vehicle 1700 in a variety of platforms and systems. For example, in at least one embodiment, SoC(s) 1704 may be combined in a system (e.g., system of vehicle 1700) with a High Definition ("HD") map 1722 which may obtain map refreshes and/or updates via network interface 1724 from one or more servers (not shown in FIG. 17C).

In at least one embodiment, CPU(s) 1706 may include a CPU cluster or CPU complex (alternatively referred to herein as a "CCPLEX"). In at least one embodiment, CPU(s) 1706 may include multiple cores and/or level two ("L2") caches. For instance, in at least one embodiment, CPU(s) 1706 may include eight cores in a coherent multi-processor configuration. In at least one embodiment, CPU(s) 1706 may include four dual-core clusters where each cluster has a dedicated L2 cache (e.g., a 2 MB L2 cache). In at least one embodiment, CPU(s) 1706 (e.g., CCPLEX) may be configured to support simultaneous cluster operation enabling any combination of clusters of CPU(s) 1706 to be active at any given time.

In at least one embodiment, one or more of CPU(s) 1706 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1706 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1708 may include an integrated GPU (alternatively referred to herein as an "iGPU"). In at least one embodiment, GPU(s) 1708 may be programmable and may be efficient for parallel workloads. In at least one embodiment, GPU(s) 1708, in at least one embodiment, may use an enhanced tensor instruction set. In on embodiment, GPU(s) 1708 may include one or more streaming microprocessors, where each streaming microprocessor may include a level one ("L 1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1708 may include at least eight streaming microprocessors. In at least one embodiment, GPU(s) 1708 may use compute application programming interface(s) (API(s)). In at least one embodiment, GPU(s) 1708 may use one or more parallel computing platforms and/or programming models (e.g., NVIDIA's CUDA).

In at least one embodiment, one or more of GPU(s) 1708 may be power-optimized for best performance in automotive and embedded use cases. For example, in on embodiment, GPU(s) 1708 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1708 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1708 may include unified memory technology. In at least one embodiment, address translation services ("ATS") support may be used to allow GPU(s) 1708 to access CPU(s) 1706 page tables directly. In at least one embodiment, embodiment, when GPU(s) 1708 memory management unit ("MMU") experiences a miss, an address translation request may be transmitted to CPU(s) 1706. In response, CPU(s) 1706 may look in its page tables for virtual-to-physical mapping for address and transmits translation back to GPU(s) 1708, in at least one embodiment. In at least one embodiment, unified memory technology may allow a single unified virtual address space for memory of both CPU(s) 1706 and GPU(s) 1708, thereby simplifying GPU(s) 1708 programming and porting of applications to GPU(s) 1708.

In at least one embodiment, GPU(s) 1708 may include any number of access counters that may keep track of frequency of access of GPU(s) 1708 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1704 may include any number of cache(s) 1712, including those described herein. For example, in at least one embodiment, cache(s) 1712 could include a level three ("L3") cache that is available to both CPU(s) 1706 and GPU(s) 1708 (e.g., that is connected both CPU(s) 1706 and GPU(s) 1708). In at least one embodiment, cache(s) 1712 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1704 may include one or more accelerator(s) 1714 (e.g., hardware accelerators, software accelerators, or a combination thereof). In at least one embodiment, SoC(s) 1704 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1708 and to off-load some of tasks of GPU(s) 1708 (e.g., to free up more cycles of GPU(s) 1708 for performing other tasks). In at least one embodiment, accelerator(s) 1714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1714 (e.g., hardware acceleration cluster) may include a deep learning accelerator(s) ("DLA). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1796; a CNN for facial recognition and vehicle owner identification using data from camera sensors; and/or a CNN for security and/or safety related events.

In at least one embodiment, DLA(s) may perform any function of GPU(s) 1708, and by using an inference accelerator, for example, a designer may target either DLA(s) or GPU(s) 1708 for any function. For example, in at least one embodiment, designer may focus processing of CNNs and floating point operations on DLA(s) and leave other functions to GPU(s) 1708 and/or other accelerator(s) 1714.

In at least one embodiment, accelerator(s) 1714 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1738, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1706. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1714 (e.g., hardware acceleration cluster) may include a computer vision network on-chip and static random-access memory ("SRAM"), for providing a high-bandwidth, low latency SRAM for accelerator(s) 1714. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1714 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1700, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1766 that correlates with vehicle 1700 orientation, distance, 3D location estimates of object obtained from neural network and/or other sensors (e.g., LIDAR sensor(s) 1764 or RADAR sensor(s) 1760), among others.

In at least one embodiment, one or more of SoC(s) 1704 may include data store(s) 1716 (e.g., memory). In at least one embodiment, data store(s) 1716 may be on-chip memory of SoC(s) 1704, which may store neural networks to be executed on GPU(s) 1708 and/or DLA. In at least one embodiment, data store(s) 1716 may be large enough in capacity to store multiple instances of neural networks for redundancy and safety. In at least one embodiment, data store(s) 1712 may comprise L2 or L3 cache(s).

In at least one embodiment, one or more of SoC(s) 1704 may include any number of processor(s) 1710 (e.g., embedded processors). Processor(s) 1710 may include a boot and power management processor that may be a dedicated processor and subsystem to handle boot power and management functions and related security enforcement. In at least one embodiment, boot and power management processor may be a part of SoC(s) 1704 boot sequence and may provide runtime power management services. In at least one embodiment, boot power and management processor may provide clock and voltage programming, assistance in system low power state transitions, management of SoC(s) 1704 thermals and temperature sensors, and/or management of SoC(s) 1704 power states. In at least one embodiment, each temperature sensor may be implemented as a ring-oscillator whose output frequency is proportional to temperature, and SoC(s) 1704 may use ring-oscillators to detect temperatures of CPU(s) 1706, GPU(s) 1708, and/or accelerator(s) 1714. In at least one embodiment, if temperatures are determined to exceed a threshold, then boot and power management processor may enter a temperature fault routine and put SoC(s) 1704 into a lower power state and/or put vehicle 1700 into a chauffeur to safe stop mode (e.g., bring vehicle 1700 to a safe stop).

In at least one embodiment, processor(s) 1710 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1710 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1710 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1710 may further include a real-time camera engine that may include, without limitation, a dedicated processor subsystem for handling real-time camera management. In at least one embodiment, processor(s) 1710 may further include a high-dynamic range signal processor that may include, without limitation, an image signal processor that is a hardware engine that is part of camera processing pipeline.

In at least one embodiment, processor(s) 1710 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1770, surround camera(s) 1774, and/or on in-cabin monitoring camera sensor(s). In at least one embodiment, in-cabin monitoring camera sensor(s) are preferably monitored by a neural network running on another instance of SoC 1704, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1708 are not required to continuously render new surfaces. In at least one embodiment, when GPU(s) 1708 are powered on and active doing 3D rendering, video image compositor may be used to offload GPU(s) 1708 to improve performance and responsiveness.

In at least one embodiment, one or more of SoC(s) 1704 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1704 may further include an input/output controller(s) that may be controlled by software and may be used for receiving I/O signals that are uncommitted to a specific role.

In at least one embodiment, one or more of SoC(s) 1704 may further include abroad range of peripheral interfaces to enable communication with peripherals, audio encoders/decoders ("codecs"), power management, and/or other devices. SoC(s) 1704 may be used to process data from cameras (e.g., connected over Gigabit Multimedia Serial Link and Ethernet), sensors (e.g., LIDAR sensor(s) 1764, RADAR sensor(s) 1760, etc. that may be connected over Ethernet), data from bus 1702 (e.g., speed of vehicle 1700, steering wheel position, etc.), data from GNSS sensor(s) 1758 (e.g., connected over Ethernet or CAN bus), etc. In at least one embodiment, one or more of SoC(s) 1704 may further include dedicated high-performance mass storage controllers that may include their own DMA engines, and that may be used to free CPU(s) 1706 from routine data management tasks.

In at least one embodiment, SoC(s) 1704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1704 may be faster, more reliable, and even more energy-efficient and space-efficient than conventional systems. For example, in at least one embodiment, accelerator(s) 1714, when combined with CPU(s) 1706, GPU(s) 1708, and data store(s) 1716, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1720) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1708.

In at least one embodiment, a CNN for facial recognition and vehicle owner identification may use data from camera sensors to identify presence of an authorized driver and/or owner of vehicle 1700. In at least one embodiment, an always on sensor processing engine may be used to unlock vehicle when owner approaches driver door and turn on lights, and, in security mode, to disable vehicle when owner leaves vehicle. In this way, SoC(s) 1704 provide for security against theft and/or cajacking.

In at least one embodiment, a CNN for emergency vehicle detection and identification may use data from microphones 1796 to detect and identify emergency vehicle sirens. In at least one embodiment, SoC(s) 1704 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1758. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1762, until emergency vehicle(s) passes.

In at least one embodiment, vehicle 1700 may include CPU(s) 1718 (e.g., discrete CPU(s), or dCPU(s)), that may be coupled to SoC(s) 1704 via a high-speed interconnect (e.g., PCIe). In at least one embodiment, CPU(s) 1718 may include an X86 processor, for example. CPU(s) 1718 may be used to perform any of a variety of functions, including arbitrating potentially inconsistent results between ADAS sensors and SoC(s) 1704, and/or monitoring status and health of controller(s) 1736 and/or an infotainment system on a chip ("infotainment SoC") 1730, for example.

In at least one embodiment, vehicle 1700 may include GPU(s) 1720 (e.g., discrete GPU(s), or dGPU(s)), that may be coupled to SoC(s) 1704 via a high-speed interconnect (e.g., NVIDIA's NVLINK). In at least one embodiment, GPU(s) 1720 may provide additional artificial intelligence functionality, such as by executing redundant and/or different neural networks, and may be used to train and/or update neural networks based at least in part on input (e.g., sensor data) from sensors of vehicle 1700.

In at least one embodiment, vehicle 1700 may further include network interface 1724 which may include, without limitation, wireless antenna(s) 1726 (e.g., one or more wireless antennas 1726 for different communication protocols, such as a cellular antenna, a Bluetooth antenna, etc.). In at least one embodiment, network interface 1724 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 170 and other vehicle and/or an indirect link may be established (e.g., across networks and over Internet). In at least one embodiment, direct links may be provided using a vehicle-to-vehicle communication link. vehicle-to-vehicle communication link may provide vehicle 1700 information about vehicles in proximity to vehicle 1700 (e.g., vehicles in front of, on side of, and/or behind vehicle 1700). In at least one embodiment, aforementioned functionality may be part of a cooperative adaptive cruise control functionality of vehicle 1700.

In at least one embodiment, network interface 1724 may include an SoC that provides modulation and demodulation functionality and enables controller(s) 1736 to communicate over wireless networks. In at least one embodiment, network interface 1724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 1700 may further include data store(s) 1728 which may include, without limitation, off-chip (e.g., off SoC(s) 1704) storage. In at least one embodiment, data store(s) 1728 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1700 may further include GNSS sensor(s) 1758 (e.g., GPS and/or assisted GPS sensors), to assist in mapping, perception, occupancy grid generation, and/or path planning functions. In at least one embodiment, any number of GNSS sensor(s) 1758 may be used, including, for example and without limitation, a GPS using a USB connector with an Ethernet to Serial (e.g., RS-232) bridge.

In at least one embodiment, vehicle 1700 may further include RADAR sensor(s) 1760. RADAR sensor(s) 1760 may be used by vehicle 1700 for long-range vehicle detection, even in darkness and/or severe weather conditions. In at least one embodiment, RADAR functional safety levels may be ASIL B. RADAR sensor(s) 1760 may use CAN and/or bus 1702 (e.g., to transmit data generated by RADAR sensor(s) 1760) for control and to access object tracking data, with access to Ethernet to access raw data in some examples. In at least one embodiment, wide variety of RADAR sensor types may be used. For example, and without limitation, RADAR sensor(s) 1760 may be suitable for front, rear, and side RADAR use. In at least one embodiment, one or more of RADAR sensors(s) 1760 are Pulse Doppler RADAR sensor(s).

In at least one embodiment, RADAR sensor(s) 1760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1760 may help in distinguishing between static and moving objects, and may be used by ADAS system 1738 for emergency brake assist and forward collision warning. Sensors 1760(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1700 surroundings at higher speeds with minimal interference from traffic in adjacent lanes. In at least one embodiment, other two antennae may expand field of view, making it possible to quickly detect vehicles entering or leaving vehicle's 1700 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1760 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1738 for blind spot detection and/or lane change assist.

In at least one embodiment, vehicle 1700 may further include ultrasonic sensor(s) 1762. ultrasonic sensor(s) 1762, which may be positioned at front, back, and/or sides of vehicle 1700, may be used for park assist and/or to create and update an occupancy grid. In at least one embodiment, a wide variety of ultrasonic sensor(s) 1762 may be used, and different ultrasonic sensor(s) 1762 may be used for different ranges of detection (e.g., 2.5 m, 4 m). In at least one embodiment, ultrasonic sensor(s) 1762 may operate at functional safety levels of ASIL B.

In at least one embodiment, vehicle 1700 may include LIDAR sensor(s) 1764. LIDAR sensor(s) 1764 may be used for object and pedestrian detection, emergency braking, collision avoidance, and/or other functions. In at least one embodiment, LIDAR sensor(s) 1764 may be functional safety level ASIL B. In at least one embodiment, vehicle 1700 may include multiple LIDAR sensors 1764 (e.g., two, four, six, etc.) that may use Ethernet (e.g., to provide data to a Gigabit Ethernet switch).

In at least one embodiment, LIDAR sensor(s) 1764 may be capable of providing a list of objects and their distances for a 360-degree field of view. In at least one embodiment, commercially available LIDAR sensor(s) 1764 may have an advertised range of approximately 100 m, with an accuracy of 2 cm-3 cm, and with support for a 100 Mbps Ethernet connection, for example. In at least one embodiment, one or more non-protruding LIDAR sensors 1764 may be used. In such an embodiment, LIDAR sensor(s) 1764 may be implemented as a small device that may be embedded into front, rear, sides, and/or corners of vehicle 1700. In at least one embodiment, LIDAR sensor(s) 1764, in such an embodiment, may provide up to a 120-degree horizontal and 35-degree vertical field-of-view, with a 200 m range even for low-reflectivity objects. In at least one embodiment, front-mounted LIDAR sensor(s) 1764 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1700 up to approximately 200 m. In at least one embodiment, a flash LIDAR unit includes, without limitation, a receptor, which records laser pulse transit time and reflected light on each pixel, which in turn corresponds to range from vehicle 1700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1766. In at least one embodiment, IMU sensor(s) 1766 may be located at a center of rear axle of vehicle 1700, in at least one embodiment. In at least one embodiment, IMU sensor(s) 1766 may include, for example and without limitation, accelerometer(s), magnetometer(s), gyroscope(s), magnetic compass(es), and/or other sensor types. In at least one embodiment, such as in six-axis applications, IMU sensor(s) 1766 may include, without limitation, accelerometers and gyroscopes. In at least one embodiment, such as in nine-axis applications, IMU sensor(s) 1766 may include, without limitation, accelerometers, gyroscopes, and magnetometers.

In at least one embodiment, IMU sensor(s) 1766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1766 may enable vehicle 1700 to estimate heading without requiring input from a magnetic sensor by directly observing and correlating changes in velocity from GPS to IMU sensor(s) 1766. In at least one embodiment, IMU sensor(s) 1766 and GNSS sensor(s) 1758 may be combined in a single integrated unit.

In at least one embodiment, vehicle 1700 may include microphone(s) 1796 placed in and/or around vehicle 1700. In at least one embodiment, microphone(s) 1796 may be used for emergency vehicle detection and identification, among other things.

In at least one embodiment, vehicle 1700 may further include any number of camera types, including stereo camera(s) 1768, wide-view camera(s) 1770, infrared camera(s) 1772, surround camera(s) 1774, long-range camera(s) 1798, mid-range camera(s) 1776, and/or other camera types. In at least one embodiment, cameras may be used to capture image data around an entire periphery of vehicle 1700. In at least one embodiment, types of cameras used depends vehicle 1700. In at least one embodiment, any combination of camera types may be used to provide necessary coverage around vehicle 1700. In at least one embodiment, number of cameras may differ depending on embodiment. For example, in at least one embodiment, vehicle 1700 could include six cameras, seven cameras, ten cameras, twelve cameras, or another number of cameras. cameras may support, as an example and without limitation, Gigabit Multimedia Serial Link ("GMSL") and/or Gigabit Ethernet. In at least one embodiment, each of camera(s) is described with more detail previously herein with respect to FIG. 17A and FIG. 17B.

In at least one embodiment, vehicle 1700 may further include vibration sensor(s) 1742. Vibration sensor(s) 1742 may measure vibrations of components of vehicle 1700, such as axle(s). For example, in at least one embodiment, changes in vibrations may indicate a change in road surfaces. In at least one embodiment, when two or more vibration sensors 1742 are used, differences between vibrations may be used to determine friction or slippage of road surface (e.g., when difference in vibration is between a power-driven axle and a freely rotating axle).

In at least one embodiment, vehicle 1700 may include ADAS system 1738. ADAS system 1738 may include, without limitation, an SoC, in some examples. In at least one embodiment, ADAS system 1738 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1760, LIDAR sensor(s) 1764, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1700 and automatically adjust speed of vehicle 1700 to maintain a safe distance from vehicles ahead. In at least one embodiment, lateral ACC system performs distance keeping, and advises vehicle 1700 to change lanes when necessary. In at least one embodiment, lateral ACC is related to other ADAS applications such as LC and CW.

In at least one embodiment, CACC system uses information from other vehicles that may be received via network interface 1724 and/or wireless antenna(s) 1726 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1700), while I2V communication concept provides information about traffic further ahead. In at least one embodiment, CACC system may include either or both I2V and V2V information sources. In at least one embodiment, given information of vehicles ahead of vehicle 1700, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1760, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1760, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1700 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1700 if vehicle 1700 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1760, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1700 is backing up. In at least one embodiment, RCTW system includes AEB system to ensure that vehicle brakes are applied to avoid a crash. In at least one embodiment, RCTW system may use one or more rear-facing RADAR sensor(s) 1760, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1700 itself decides, in case of conflicting results, whether to heed result from a primary computer or a secondary computer (e.g., first controller 1736 or second controller 1736). For example, in at least one embodiment, ADAS system 1738 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1738 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1704.

In at least one embodiment, ADAS system 1738 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1738 may be fed into primary computer's perception block and/or primary computer's dynamic driving task block. For example, in at least one embodiment, if ADAS system 1738 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1700 may further include infotainment SoC 1730 (e.g., an in-vehicle infotainment system (IVI)). Although illustrated and described as an SoC, infotainment system 1730, in at least one embodiment, may not be an SoC, and may include, without limitation, two or more discrete components. In at least one embodiment, infotainment SoC 1730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1700. For example, infotainment SoC 1730 could include radios, disk players, navigation systems, video players, USB and Bluetooth connectivity, carputers, in-car entertainment, WiFi, steering wheel audio controls, hands free voice control, a heads-up display ("HUD"), HMI display 1734, a telematics device, a control panel (e.g., for controlling and/or interacting with various components, features, and/or systems), and/or other components. In at least one embodiment, infotainment SoC 1730 may further be used to provide information (e.g., visual and/or audible) to user(s) of vehicle, such as information from ADAS system 1738, autonomous driving information such as planned vehicle maneuvers, trajectories, surrounding environment information (e.g., intersection information, vehicle information, road information, etc.), and/or other information.

In at least one embodiment, infotainment SoC 1730 may include any amount and type of GPU functionality. In at least one embodiment, infotainment SoC 1730 may communicate over bus 1702 (e.g., CAN bus, Ethernet, etc.) with other devices, systems, and/or components of vehicle 1700. In at least one embodiment, infotainment SoC 1730 may be coupled to a supervisory MCU such that GPU of infotainment system may perform some self-driving functions in event that primary controller(s) 1736 (e.g., primary and/or backup computers of vehicle 1700) fail. In at least one embodiment, infotainment SoC 1730 may put vehicle 1700 into a chauffeur to safe stop mode, as described herein.

In at least one embodiment, vehicle 1700 may further include instrument cluster 1732 (e.g., a digital dash, an electronic instrument cluster, a digital instrument panel, etc.). Instrument cluster 1732 may include, without limitation, a controller and/or supercomputer (e.g., a discrete controller or supercomputer). In at least one embodiment, instrument cluster 1732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1730 and instrument cluster 1732. In at least one embodiment, instrument cluster 1732 may be included as part of infotainment SoC 1730, or vice versa.

Inference and/or training logic 115 are used to perform inferencing and/or training operations associated with one or more embodiments. In at least one embodiment, inference and/or training logic 115 may be used in system FIG. 17C for inferencing or predicting operations based, at least in part, on weight parameters calculated using neural network training operations, neural network functions and/or architectures, or neural network use cases described herein.

Figure 17D:
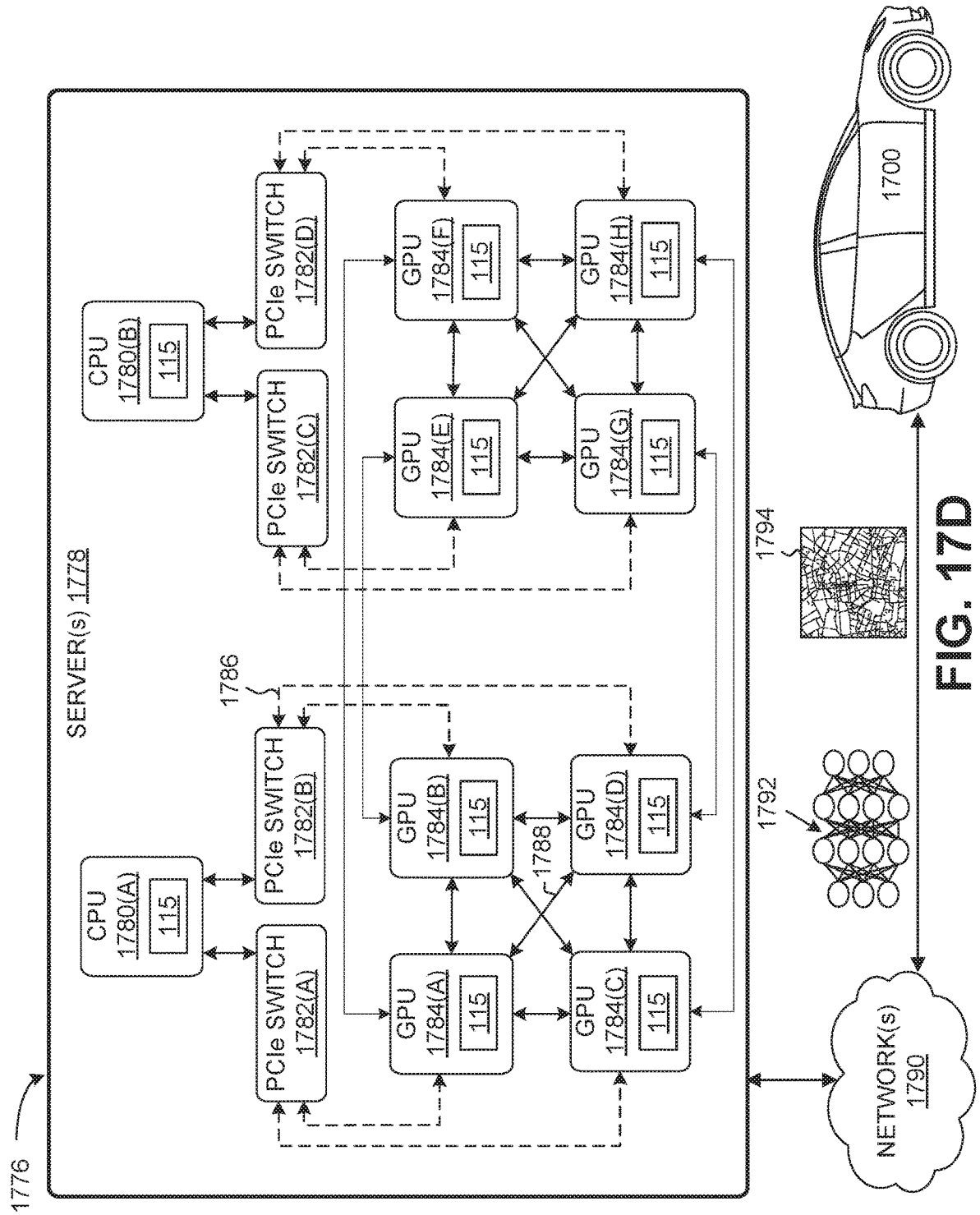
FIG. 17D is a diagram illustrating a system for communication between cloud-based server(s) and the autonomous vehicle of FIG. 17A, according to at least one embodiment.

FIG. 17D is a diagram of a system 1776 for communication between cloud-based server(s) and autonomous vehicle 1700 of FIG. 17A, according to at least one embodiment. In at least one embodiment, system 1776 may include, without limitation, server(s) 1778, network(s) 1790, and any number and type of vehicles, including vehicle 1700. Server(s) 1778 may include, without limitation, a plurality of GPUs 1784(A)-1784(H) (collectively referred to herein as GPUs 1784), PCIe switches 1782(A)-1782(H) (collectively referred to herein as PCIe switches 1782), and/or CPUs 1780(A)-1780(B) (collectively referred to herein as CPUs 1780). GPUs 1784, CPUs 1780, and PCIe switches 1782 may be interconnected with high-speed interconnects such as, for example and without limitation, NVLink interfaces 1788 developed by NVIDIA and/or PCIe connections 1786. In at least one embodiment, GPUs 1784 are connected via an NVLink and/or NVSwitch SoC and GPUs 1784 and PCIe switches 1782 are connected via PCIe interconnects. In at least one embodiment, although eight GPUs 1784, two CPUs 1780, and four PCIe switches 1782 are illustrated, this is not intended to be limiting. In at least one embodiment, each of server(s) 1778 may include, without limitation, any number of GPUs 1784, CPUs 1780, and/or PCIe switches 1782, in any combination. For example, in at least one embodiment, server(s) 1778 could each include eight, sixteen, thirty-two, and/or more GPUs 1784.

In at least one embodiment, server(s) 1778 may receive, over network(s) 1790 and from vehicles, image data representative of images showing unexpected or changed road conditions, such as recently commenced road-work. In at least one embodiment, server(s) 1778 may transmit, over network(s) 1790 and to vehicles, neural networks 1792, updated neural networks 1792, and/or map information 1794, including, without limitation, information regarding traffic and road conditions. In at least one embodiment, updates to map information 1794 may include, without limitation, updates for HD map 1722, such as information regarding construction sites, potholes, detours, flooding, and/or other obstructions. In at least one embodiment, neural networks 1792, updated neural networks 1792, and/or map information 1794 may have resulted from new training and/or experiences represented in data received from any number of vehicles in environment, and/or based at least in part on training performed at a data center (e.g., using server(s) 1778 and/or other servers).

In at least one embodiment, server(s) 1778 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1790, and/or machine learning models may be used by server(s) 1778 to remotely monitor vehicles.

In at least one embodiment, server(s) 1778 may receive data from vehicles and apply data to up-to-date real-time neural networks for real-time intelligent inferencing. In at least one embodiment, server(s) 1778 may include deeplearning supercomputers and/or dedicated AI computers powered by GPU(s) 1784, such as a DGX and DGX Station machines developed by NVIDIA. However, in at least one embodiment, server(s) 1778 may include deep learning infrastructure that use CPU-powered data centers.

In at least one embodiment, deep-learning infrastructure of server(s) 1778 may be capable of fast, real-time inferencing, and may use that capability to evaluate and verify health of processors, software, and/or associated hardware in vehicle 1700. For example, in at least one embodiment, deep-learning infrastructure may receive periodic updates from vehicle 1700, such as a sequence of images and/or objects that vehicle 1700 has located in that sequence of images (e.g., via computer vision and/or other machine learning object classification techniques). In at least one embodiment, deep-learning infrastructure may run its own neural network to identify objects and compare them with objects identified by vehicle 1700 and, if results do not match and deep-learning infrastructure concludes that AI in vehicle 1700 is malfunctioning, then server(s) 1778 may transmit a signal to vehicle 1700 instructing a fail-safe computer of vehicle 1700 to assume control, notify passengers, and complete a safe parking maneuver.

In at least one embodiment, server(s) 1778 may include GPU(s) 1784 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    determining, based at least in part on an image of an object and a previous position of the object, an updated position of the object using a particle filter;
    determining, based at least in part on the image and a previous orientation of the object, a distribution of possible orientations of the object using a network trained to recognize possible orientations of the object; and
    providing information to a control system based at least in part on the updated position and the distribution of possible orientations.

2. The computer-implemented method of claim 1, wherein:
    the network is an autoencoder; and
    the autoencoder is trained using a set of images representing a range of rotational orientations of an object.

3. The computer-implemented method of claim 1, wherein the distribution of possible orientations is determined using a Rao-Blackwellized particle filter.

4. The computer-implemented method of claim 1, further comprising:
- determining a bounding box around the object based at least in part on the updated position of the object; and
- estimating an orientation of the object based at least in part on the appearance of the object in the bounding box.

5. The computer-implemented method of claim 1, wherein:
- the distribution of possible orientations is determined using a codebook; and
- the codebook is generated by generating a code for a plurality of discretized rotations of the object.

6. The computer-implemented method of claim 5, wherein the likelihood of a particular rotation is based at least in part on a distance between a code in the codebook corresponding to the particular rotation, and a code generated from the image.

7. The computer-implemented method of claim 5, wherein the updated position of the object and the distribution of possible orientations are combined to produce a 6D pose of the object.

8. The computer-implemented method of claim 1, wherein the control system is a vehicle control system in a first vehicle and the object is a second vehicle.

9. The computer-implemented method of claim 8, wherein the vehicle control system presents an informational display to an operator of the first vehicle based at least in part on the information.

10. A computer system, comprising:
- one or more processors; and
- memory storing executable instructions that, as a result of being executed by the one or more processors, cause the computer system to:
  - determine, based at least in part on an image of an object and a previous position of the object, an updated position of the object using a particle filter;
  - determine, based at least in part on the image and a previous orientation of the object, a distribution of possible orientations of the object using a network trained to recognize possible orientations of the object; and
  - control an interaction with the object based on the distribution of possible orientations.

11. The system of claim 10, wherein the network is an autoencoder trained to recognize similarity between individual images in a set of images representing rotations of the object, and the image.

12. The system of claim 11, wherein the output of the autoencoder is based at least in part on a previous distribution of possible orientations of the object.

13. The system of claim 11, wherein:
- the autoencoder produces a measure of similarity between the image and a set of reference images of the object; and
- the set of reference images represent a plurality of possible rotations of the object.

14. The system of claim 13, wherein the measure of similarity is determined by comparing a code of a reference image to a code of a portion of the image.

15. The system of claim 10, wherein the distribution of possible orientations of the object is based at least in part on a previous distribution of possible orientations of the object.

16. The system of claim 10, wherein the executable instructions, as a result of being executed by the one or more processors, cause the computer system to further:
- identify a number of discrete orientations of the object corresponding to a number of planes of symmetry of the object.

17. The system of claim 10, wherein:
- a bounding box in the image is determined for the object based at least in part on the updated position of the object; and
- the portion of the image is determined based at least in part on the bounding box.

18. The system of claim 10, wherein the interaction with the object is a controlled movement of a vehicle relative to the object.

19. The system of claim 18, wherein the controlled movement maintains a relative position between the vehicle and the object.

20. A non-transitory machine-readable medium having stored thereon a set of instructions, which if performed by one or more processors, cause the one or more processors to at least:
- determine, based at least in part on an image of an object and a previous position of the object, an updated position of the object using a particle filter;
- determine, based at least in part on the image and a previous orientation of the object, a distribution of possible orientations of the object using a network trained to recognize possible orientations of the object; and
- cause a robot to interact with the object based at least in part on the updated position and the distribution of possible orientations.

21. The non-transitory machine-readable medium of claim 20, wherein:
- the robot is an autonomous vehicle;
- the object is a second vehicle; and
- the interaction involves directing the autonomous vehicle to avoid the second vehicle.

22. The non-transitory machine-readable medium of claim 20, wherein the instructions further comprise instructions that, as a result of being executed by the one or more processors, cause the one or more processors to:
- identify a type of the object in the image;
- select, from a set of codebooks, a codebook associated with the type; and
- use the selected codebook to determine the distribution of possible orientations.

23. The non-transitory machine-readable medium of claim 20, wherein the instructions further comprise instructions that, as a result of being executed by the one or more processors, cause the one or more processors to determine a discrete 6P pose of the object based at least in part on the updated position of the object and the distribution of possible orientations of the object.

24. The non-transitory machine-readable medium of claim 23, wherein the instructions further comprise instructions that, as a result of being executed by the one or more processors, cause the one or more processors to render a second object onto the image relative to the discrete 6D pose of the object.

* * * * *